US011683457B2

(12) United States Patent
Yanagisawa et al.

(10) Patent No.: US 11,683,457 B2
(45) Date of Patent: Jun. 20, 2023

(54) OPTICAL DEVICE AND IMAGE DISPLAY DEVICE

(71) Applicant: SEIKO EPSON CORPORATION, Tokyo (JP)

(72) Inventors: Yoshiyuki Yanagisawa, Matsumoto (JP); Masatoshi Ito, Matsumoto (JP); Shinichi Wakabayashi, Suwa (JP)

(73) Assignee: Seiko Epson Corportation, Tokyo (JP)

( * ) Notice: Subject to any disclaimer, the term of this patent is extended or adjusted under 35 U.S.C. 154(b) by 0 days.

(21) Appl. No.: 17/507,905

(22) Filed: Oct. 22, 2021

(65) Prior Publication Data

US 2022/0132084 A1    Apr. 28, 2022

(30) Foreign Application Priority Data

Oct. 23, 2020  (JP) .............................. JP2020-178016

(51) Int. Cl.
*H04N 9/31* (2006.01)
*G02B 26/08* (2006.01)

(52) U.S. Cl.
CPC ....... *H04N 9/3152* (2013.01); *G02B 26/0875* (2013.01)

(58) Field of Classification Search
CPC .... H04N 9/315; H04N 9/3102; H04N 9/3108; H04N 9/3141; H04N 9/3152; G03B 21/006; G03B 21/008; G03B 21/28; G03B 21/145; G03B 21/208; G03B 21/2053; G02B 26/0875; G02B 26/08; G02B 26/0816; G02B 26/105; G02B 26/3512

See application file for complete search history.

(56) References Cited

U.S. PATENT DOCUMENTS

| 9,983,405 | B2* | 5/2018 | Hino .................... G03B 21/14 |
| 2016/0124217 | A1 | 5/2016 | Kojima et al. |
| 2016/0187645 | A1 | 6/2016 | Mizoguchi et al. |
| 2016/0363840 | A1 | 12/2016 | Mizoguchi et al. |
| 2018/0095269 | A1 | 4/2018 | Mizoguchi et al. |
| 2019/0278102 | A1 | 9/2019 | Suter et al. |

(Continued)

FOREIGN PATENT DOCUMENTS

| JP | 2016-090751 | 5/2016 |
| JP | 2016-126103 | 7/2016 |

(Continued)

*Primary Examiner* — Sultan Chowdhury
(74) *Attorney, Agent, or Firm* — Dority & Manning, P.A.

(57) ABSTRACT

An optical device includes an optical device including, a movable frame configured to hold an optical member, and a coupling frame to be coupled to the movable frame via an oscillation axis, and a stationary frame to which the coupling frame is fixed via a vibration absorbing member. The stationary frame has a shaft part to which the vibration absorbing member is attached, and a first surface and a second surface opposed to each other outside the shaft part, the coupling frame is disposed so as to be separated from the shaft part, the first surface, and the second surface with the vibration absorbing member, and a thickness of the vibration absorbing member existing between the coupling frame and the first surface and/or the second surface is thicker than a thickness of the vibration absorbing member existing between the coupling frame and the shaft part of the stationary frame.

13 Claims, 15 Drawing Sheets

(56) References Cited

U.S. PATENT DOCUMENTS

2020/0264445 A1* 8/2020 Chen .................... G03B 21/145
2020/0326613 A1* 10/2020 Huang ................. G03B 21/142

FOREIGN PATENT DOCUMENTS

| JP | 2017-003744 | 1/2017 |
| JP | 2018-054974 | 4/2018 |
| JP | 2019-053128 | 4/2019 |

* cited by examiner

FIG. 1
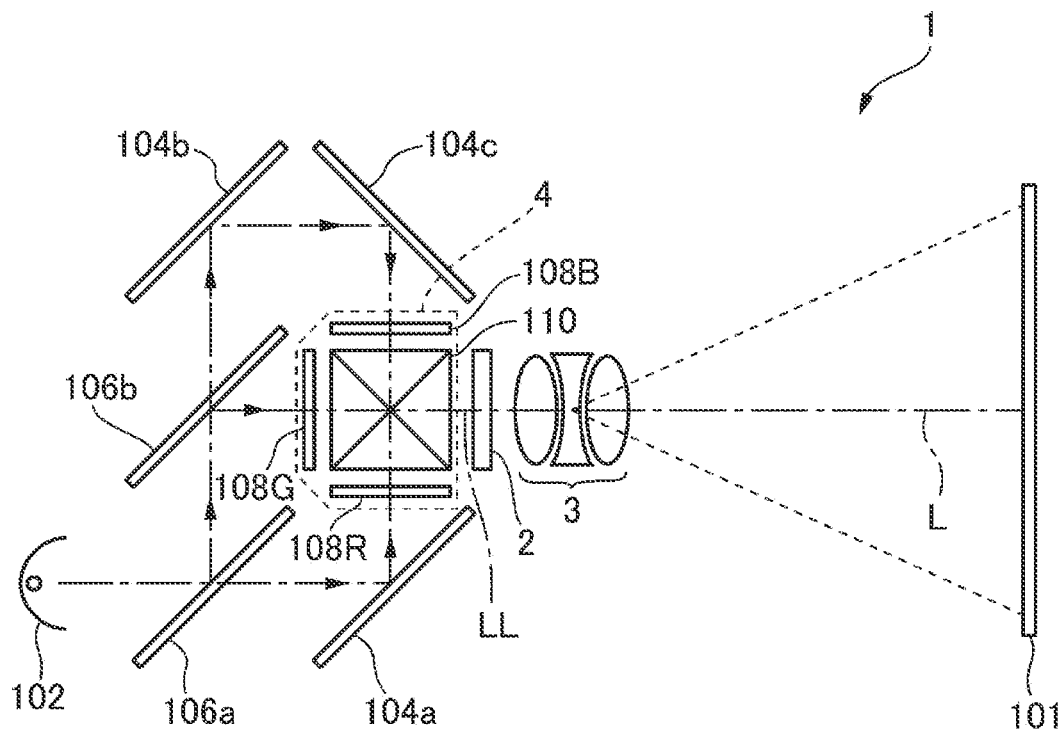
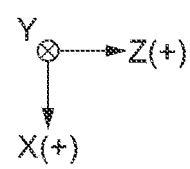

FIG. 5
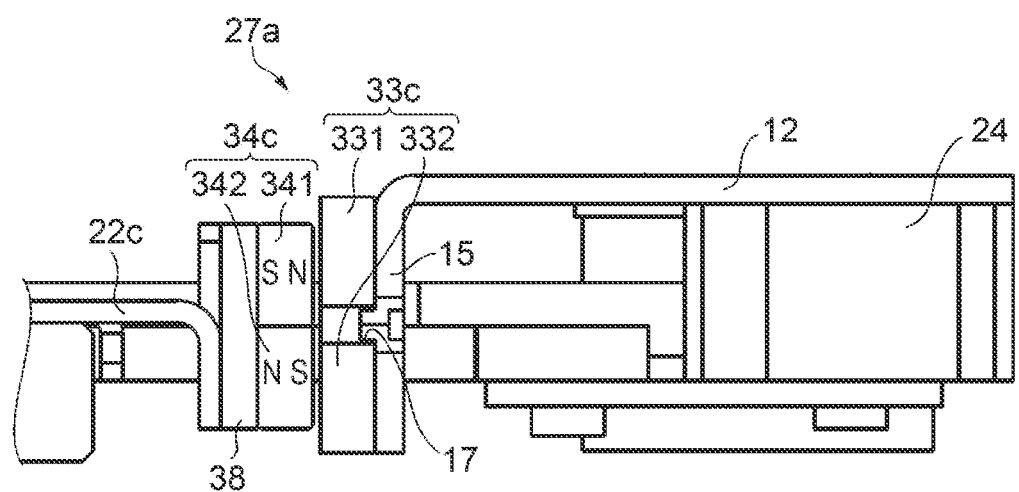
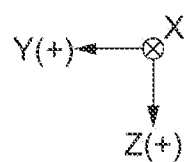

OPTICAL DEVICE AND IMAGE DISPLAY DEVICE

The present application is based on, and claims priority from JP Application Serial Number 2020-178016, filed Oct. 23, 2020, the disclosure of which is hereby incorporated by reference herein in its entirety.

BACKGROUND

1. Technical Field

The present disclosure relates to an optical device, and an image display device provided with the optical device.

2. Related Art

In the past, there has been known a technology of shifting an axis of image light emitted from a light modulation device to thereby increase the resolution of the image to be projected in a projector for projecting the light modulated by a light modulation element such as a liquid crystal panel in an enlarged manner. Such a projector is provided with an optical device including a light path changing element which shifts a light path of light entering the light path changing element between the light modulation element and a projection optical system. The optical device reciprocally drives the tilt of the light path changing element between a first position and a second position to thereby shift the light path of the light entering the light path changing element as much as an amount smaller than an amount corresponding to one pixel, and thus, makes it possible to display an image higher in resolution than the light modulation device.

For example, in the specification of US-2019/278102-A1 (Document 1), there is disclosed a projector provided with an optical device corresponding to the optical device. According to Document 1, the optical device has a structure of reducing a vibration noise when reciprocally driving the light path changing element. In particular, as shown in FIG. 24 of Document 1, the optical device is provided with a noise vibration suppression platform, and on the four corners of the noise vibration suppression platform, there are disposed attachment members for reducing the vibration noise. The attachment members each have a cylindrical shape, and as the material thereof, there are cited rubber, a ring, fluorine resin, polyethylene, and silicone.

However, in the optical device in Document 1, there is a possibility that the projection image with a resolution as high as the resolution which the device should originally achieve cannot be obtained. In particular, there is a possibility that the accuracy (motion followability) of the reciprocal drive of the light path changing element is affected when suppressing a micro vibration with the attachment members, the vibration and the noise increase when the suppression of the micro vibration is insufficient, and thus, the both parties are in a paradoxical relationship. Further, when providing a complicated mechanism for achieving the micro vibration suppression, growth in size is incurred.

In other words, there has been required an image display device which is low in noise and can obtain a high-resolution projection image with a simple configuration.

SUMMARY

An optical device according to the present disclosure includes an optical device including an optical member having a plane of incidence which light enters, a movable frame configured to hold the optical member, and a coupling frame to be coupled to the movable frame via an oscillation axis, and a stationary frame to which the coupling frame in the optical device is fixed via a vibration absorbing member, wherein the stationary frame has a shaft part to which the vibration absorbing member is attached, and a first surface and a second surface opposed to each other outside the shaft part, the coupling frame is disposed so as to be separated from the shaft part, the first surface, and the second surface with the vibration absorbing member, and at least one of a thickness of the vibration absorbing member existing between the coupling frame and the first surface in the stationary frame and a thickness of the vibration absorbing member existing between the coupling frame and the second surface in the stationary frame is thicker than a thickness of the vibration absorbing member existing between the coupling frame and the shaft part of the stationary frame.

An image display device according to the present disclosure includes a light modulation element including a plurality of pixels, a projection optical system configured to project light from the light modulation element, and the optical device described above which the light from the light modulation element enters.

BRIEF DESCRIPTION OF THE DRAWINGS

FIG. 1 is an optical configuration diagram of a projector according to Embodiment 1.

FIG. 5 is a sectional side view of an actuator.

DESCRIPTION OF EXEMPLARY EMBODIMENTS

Embodiment 1

*Schematic Configuration of Projector*

Figure 2:
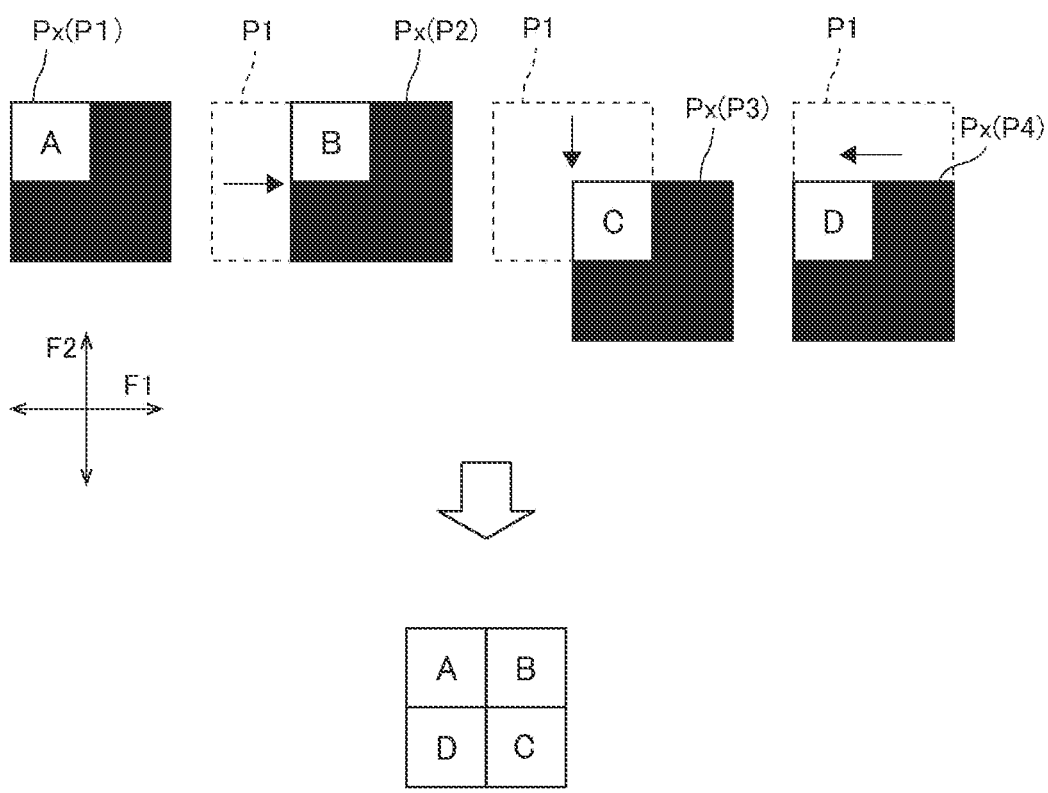
FIG. 2 is an explanatory diagram showing a transition of an image display position by a light path shift.

FIG. 1 is an optical configuration diagram of a projector according to Embodiment 1.

The projector 1 as an image display device shown in FIG. 1 is a projector using a liquid crystal panel as a light modulation element. The projector 1 generates image light LL based on a video signal input from the outside in a light modulation device 4, and then projects the image light LL in an enlarged manner via a projection optical device 3 to thereby display an enlarged projection image on a screen 101.

It should be noted that a Z axis in FIG. 1 coincides with a light axis L of the image light LL, and a proceeding direction of the image light LL corresponds to a positive Z direction. Further, an axis perpendicular to the Z axis is defined as an X axis. Centering on the light modulation device 4, a liquid crystal display element 108R side is defined as a positive X direction, and a liquid crystal display element 108B side is defined as a negative X direction. Further, an axis perpendicular to a plane (a plane of the sheet) including the X axis and the Z axis is defined as a Y axis. A depth direction of the plane of the sheet of FIG. 1 corresponds to a positive Y direction, and a front direction of the plane of the sheet corresponds to a negative Y direction. The same applies to the rest of the drawings.

The projector 1 is constituted by a light source 102, a dichroic mirror 106a, a mirror 104a, a dichroic mirror 106b, mirrors 104b, 104c, a light modulation device 4, a projection optical device 3, an optical device 2, and so on. It should be noted that these constituents are housed in a chassis, but are omitted from the illustration.

The light source 102 uses a laser source for emitting white light as a preferred example. It should be noted that it is sufficient for the light source 102 to be a light source for emitting the white light, and there can be used, for example, a halogen lamp, a mercury lamp, or a light emitting diode (LED).

The light emitted from the light source 102 is separated by the dichroic mirror 106a into red light and the rest of the light. The red light is reflected by the mirror 104a, then enters the liquid crystal display element 108R, and the rest of the light is further separated by the dichroic mirror 106b into green light and blue light. The green light enters the liquid crystal display element 108G, and the blue light is reflected by the mirrors 104b, 104c, and then enters the liquid crystal display element 108B.

The light modulation device 4 is constituted by liquid crystal display elements 108R, 108G, and 108B, and a dichroic prism 110.

The liquid crystal display elements 108R, 108G, and 108B are each a light modulation element for modulating light which enters the light modulation element in accordance with an image signal. The liquid crystal display elements 108R, 108G, and 108B are each a transmissive liquid crystal panel, and are each provided with pixels arranged in, for example, a 1080×1920 matrix. In each of the pixels, the light intensity of the transmitted light with respect to the incident light is controlled, and in each of the liquid crystal display elements 108R, 108G, and 108B, the light intensity distribution of all of the pixels is controlled in a coordinated manner.

The liquid crystal display elements 108R, 108G, and 108B are disposed so as to respectively face the three sides of the dichroic prism 110 forming a substantially square shape in a plan view. It should be noted that regarding the content common to the liquid crystal display elements 108R, 108G, and 108B, the three liquid crystal display elements 108R, 108G, and 108B will hereinafter be described collectively as the liquid crystal display elements 108.

The red light R, the green light G, and the blue light B respectively modulated by the liquid crystal display elements 108R, 108G, and 108B enter the dichroic prism 110 from three directions. In the dichroic prism 110, the red light enters the dichroic prism 110 from the positive X direction, and is then reflected 90 degrees to proceed toward the positive Z direction. Similarly, the blue light enters the dichroic prism 110 from the negative X direction, and is then reflected 90 degrees to proceed toward the positive Z direction. Further, the green light enters the dichroic prism 110 from the negative Z direction, and is then transmitted to proceed toward the positive Z direction.

In such a manner, the red light, the green light, and the blue light are combined with each other in the dichroic prism 110 as the image light LL for displaying a color image, and are then emitted toward the optical device 2.

Then, the pixel shift is performed by the optical device 2 on the image light LL thus emitted, and then, the image light LL is enlarged and projected on the screen 101 by the projection optical device 3. The projection optical device 3 is a magnifying projection optical system provided with a plurality of lenses.

It should be noted that the light modulation device 4 is not limited to the configuration using the transmissive liquid crystal display element, and is sufficiently a light modulation device capable of modulating the incident light in accordance with the image signal. For example, the light modulation device 4 can be a light modulation device provided with a reflective liquid crystal panel, or it is possible to use a light modulation device provided with a DMD (digital micromirror device).

*General Outline of Pixel Shift*

Figure 3:
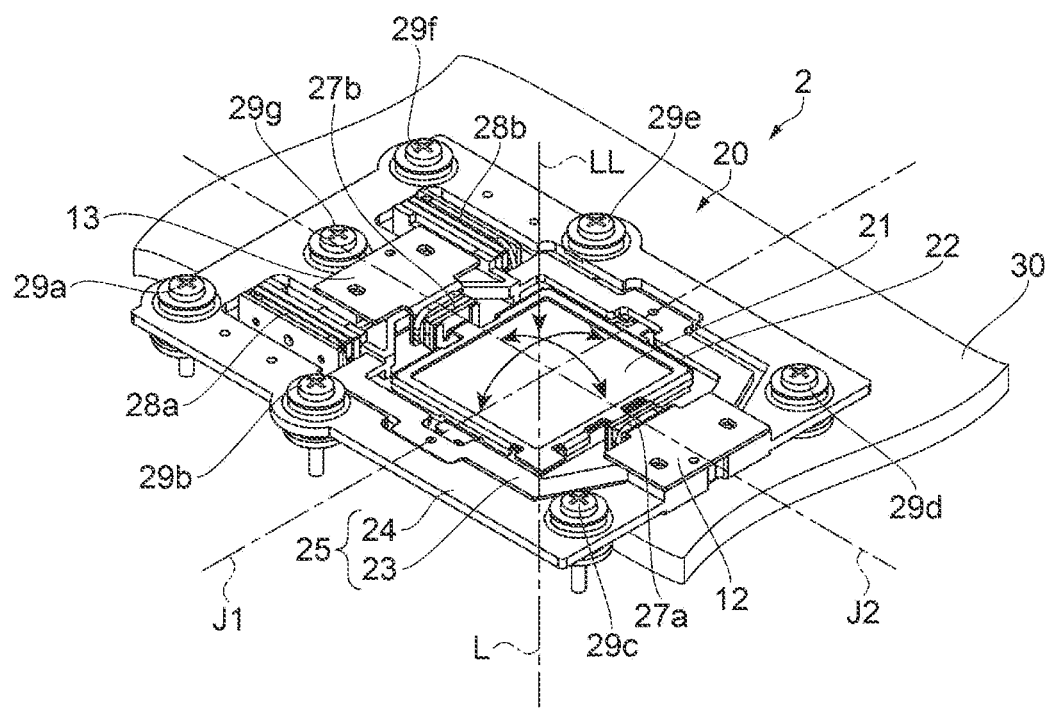
FIG. 3 is a perspective view of an optical device.

FIG. 2 is an explanatory diagram showing a transition of an image display position by a light path shift. FIG. 3 is a perspective view of the optical device.

As described above, the projector 1 is provided with the optical device 2 disposed between the dichroic prism 110 and the projection optical device 3. It is possible for the projector 1 to project an image higher in resolution than the liquid crystal display elements 108 on the screen 101 by making the optical device 2 shift the light path of the image light LL. For example, when the liquid crystal display elements 108 are compliant with full high definition, a 4K image can be displayed. It should be noted that shifting the light path of the image light LL is also referred to as "pixel shift."

As shown in FIG. 3, the optical device 2 has a glass plate 21 as an optical member shaped like a plate which the image light LL emitted from the light modulation device 4 enters, and changes the posture of the glass plate 21 to thereby shift the light path of the image light LL using refraction.

The optical device 2 oscillates the glass plate 21 in two directions, namely a first oscillation direction around a first oscillation axis J1 crossing the light axis L, and a second oscillation direction around a second oscillation axis J2 crossing the light axis L and the first oscillation axis J1.

As shown in FIG. 2, when the glass plate 21 oscillates in the first oscillation direction, the light path of the light entering the glass plate 21 is shifted toward a first direction F1. When the glass plate 21 oscillates in the second oscillation direction, the light path of the light entering the glass plate 21 is shifted toward a second direction F2 crossing the first direction F1. Thus, the pixel Px to be displayed on the screen 101 is displayed so as to be shifted in the first direction F1 and the second direction F2 crossing the first direction F1. It should be noted that in the configuration shown in FIG. 1, the first direction F1 corresponds to the Y-axis direction, and the second direction F2 corresponds to the X-axis direction, but it is sufficient for the first direction F1 and the second direction F2 to be two directions crossing each other.

The projector 1 combines the shift of the light path in the first direction F1 and the shift of the light path in the second direction F2 with each other to thereby increase the apparent pixels to achieve high resolution of the image to be projected on the screen 101.

For example, as shown in FIG. 2, the pixel Px is moved to a position shifted as much as a half pixel (i.e., a half of the pixel Px) in each of the first direction F1 and the second direction F2. Thus, it is possible to shift the image display position on the screen 101 to an image display position P2 shifted from an image display position P1 toward the first direction F1 as much as a half pixel, an image display position P3 shifted from the image display position P1 toward each of the first direction F1 and the second direction F2 as much as a half pixel, and an image display position P4 shifted from the image display position P1 toward the second direction F2 as much as a half pixel.

As shown in FIG. 2, the light path shifting operation is performed so as to display an image at each of the image display positions P1, P2, P3, and P4 for a certain period to vary the display content in the liquid crystal display element 108 in sync with the light path shifting operation. Thus, it is possible to apparently display pixels A, B, C, and D smaller in size than the pixel Px. For example, when performing display of the pixels A, B, C, and D with a frequency of 60 Hz as a whole, it is necessary to make the liquid crystal display element 108 perform the display at quad speed in accordance with the image display positions P1, P2, P3, and P4. In other words, the frequency of the display in the liquid crystal display element 108, namely a so-called refresh rate, becomes 240 Hz.

*Configuration of Optical Device*

Figure 4:
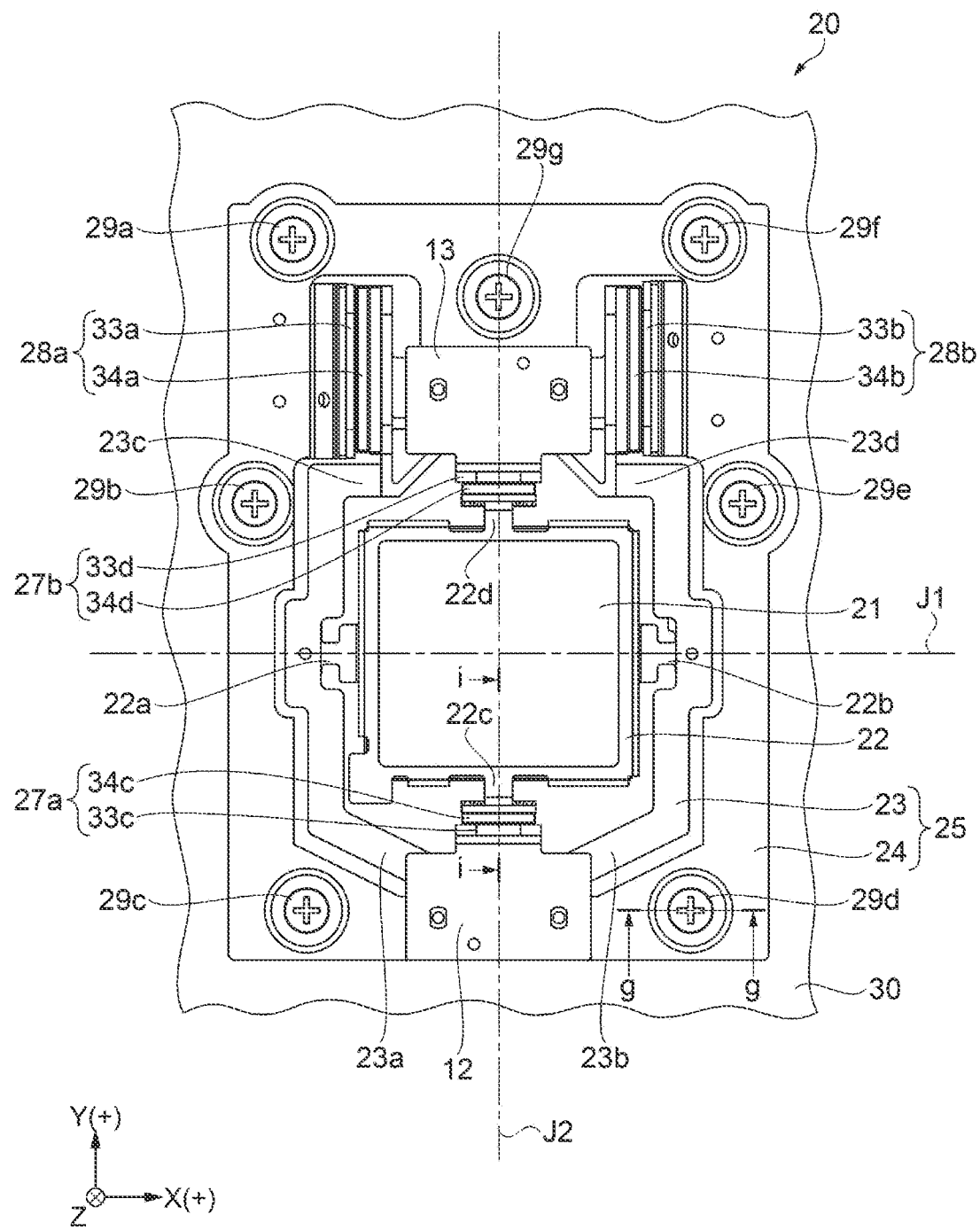
FIG. 4 is a plan view of the optical device.

FIG. 4 is a plan view of the optical device.

Here, the configuration of the optical device 2 and the optical device 20 will be described using FIG. 3 and FIG. 4.

As shown in FIG. 3, the optical device 2 is constituted by a stationary frame 30, an optical device 20, and so on.

The stationary frame 30 is a frame body which supports the optical device 20, and is coupled to the light modulation device 4 (FIG. 1), and is formed of die-casting aluminum in a preferred example. It should be noted that the die-casting aluminum is not a limitation, it is sufficient to be a material which is robust, light weight, excellent in heat resistance, and it is possible to use, for example, a pressed metal component or heat-resistant resin.

Further, a portion overlapping the glass plate 21 of the optical device 20 in the stationary frame 30 forms an opening part (not shown) to have a configuration capable of transmitting the image light LL. In particular, the stationary frame 30 has the opening part in the portion overlapping a movable frame 22 for holding the glass plate 21.

The optical device 20 is attached to the stationary frame 30 with seven coupling sections 29a through 29g. It should be noted that the details of the coupling sections 29a through 29g will be described later.

The optical device 20 is constituted by the glass plate 21, the movable frame 22, a coupling frame 25, first actuators 27a, 27b, second actuators 28a, 28b, and so on.

The glass plate 21 is an optical member having a plane of incidence, and super white glass having a rectangular shape is used in a preferred example. A surface at the negative Z side in the glass plate 21 becomes the plane of incidence, and a surface at the opposite side to the plane of incidence becomes an exit surface. The image light LL enters from the plane of incidence of the glass plate 21, and is emitted from the exit surface toward the projection optical device 3 (FIG. 1). By adopting the super white glass excellent in strength as the glass plate 21, the rigidity of the whole of the movable frame 22 increases, and therefore, it is possible to suppress a deflection variation of the light deflected in the glass plate 21. It should be noted that the super white glass is not a limitation, it is sufficient to be a material which has light transmissive property, and is capable of refracting the image light, and it is possible to use a variety of glass materials such as borosilicate glass or quartz glass. Alternatively, it is also possible to use a variety of crystalline materials such as quartz crystal or sapphire, or a variety of resin materials such as polycarbonate series resin or acrylic resin. It should be noted that the shape of the glass plate 21 is not limited to the rectangular shape, and is sufficiently a shape capable of refracting the image light, and can also be a square shape, a rhombic shape, or an elliptical shape.

The movable frame 22 is a frame shaped like a picture frame for holding the glass plate 21, and in the preferred example, there is used a frame made of aluminum light in weight. As shown in FIG. 4, on two sides opposed to each other of the movable frame 22, there are disposed support parts 22a, 22b along the first oscillation axis J1. Further, on other two sides of the movable frame 22, there are disposed arm parts 22c, 22d along the second oscillation axis J2.

The coupling frame 25 is configured including an inner frame 23 which supports the movable frame 22, and an outer frame 24 disposed at an outer side of the inner frame 23. In other words, the coupling frame 25 is provided with the outer frame 24 and the inner frame 23 coupled to the first oscillation axis J1 in the inside of the outer frame 24. In the preferred example, a frame made of aluminum is used as the coupling frame 25.

To the inner frame 23, there is coupled the movable frame 22 so as to be able to oscillate with the support parts 22a, 22b disposed along the first oscillation axis J1.

The outer frame 24 forms a rectangular shape in a plan view, and is fixed to the stationary frame 30 with the coupling sections 29a through 29g located at the seven places including the vicinities of the four vertexes outside the rectangular shape. The movable frame 22 is disposed at the position slightly shifted toward the negative Y direction from the center of the outer frame 24. Outside along the second oscillation axis J2 of the movable frame 22 in the outside frame 24, there are disposed a pair of first actuators 27a, 27b. Further, outside the first actuator 27a, there is disposed a coil support frame 12. Outside the first actuator 27b, there is disposed a coil support frame 13.

FIG. 5 is a sectional side view in an i-i' cross-sectional surface shown in FIG. 4, and shows a cross-sectional structure of the first actuator. Here, the configuration of the actuator will be described using FIG. 5.

The first actuator 27a is constituted by a coil 33c, a magnet 34c, and so on.

As shown in FIG. 5, the coil support frame 12 is fixed to the outer frame 24, and an end part at the movable frame 22 side is folded back to form an L shape to thereby form a flange part 15. The coil support frame 12 is a frame made of metal, and the coil 33c is attached to the flange part 15. In the preferred example, the coil support frame 12 is made of iron, and the flange part 15 functions as a back yoke for the coil 33c.

An end part of the arm part 22c of the movable frame 22 is also folded back to form an L shape, and a magnet frame 38 is fixed to the surface thus folded back. To the magnet frame 38, there is attached the magnet 34c. The magnet frame 38 is a plate-like member formed of metal such as iron, and functions as the back yoke.

The magnet frame 38 has a configuration in which two rod-like magnets 341, 342 are stacked in an extending direction of the Z axis. The magnet 341 is rod-like magnet elongated in the extending direction of the X axis. The magnet 341 is disposed with the north pole facing to the coil 33c. The magnet 342 is also a rod-like magnet the same in length as the magnet 341, but is disposed with the south pole facing to the coil 33c. As the preferred example, as the magnets 341, 342, there is used a neodymium magnet. It should be noted that the neodymium magnet is not a limitation, and a permanent magnet having a desired magnetic force is sufficient, and there can be used a samarium-cobalt magnet, a ferrite magnet, and an alnico magnet.

In the middle of the flange part 15 of the coil support frame 12, there is formed a protruding part 17. The protruding part 17 extends in the extending direction of the X axis, and the coil 33c is disposed so as to surround the protruding part 17. When observing the coil 33c from the magnet 34c side, the coil 33c forms a rectangular shape with rounded corners which surrounds the protruding part 17. It should be noted that the rectangular shape with rounded corners is also referred to as a track shape. The length in the long side direction of the coil 33c is substantially the same as those of the magnets 341, 342.

Due to such a configuration, the coil 33c and the magnet 34c in the first actuator 27a are disposed so as to be opposed to each other with a gap. In particular, as shown in FIG. 5, the coil 33c and the magnet 341 are arranged so that a long side 331 of the coil 33c faces the magnet 341 and a long side 332 faces the magnet 342 in an initial state in which the movable frame 22 is not tilted. It should be noted that the first actuator 27b (FIG. 4) forming a pair with the first actuator 27a also has the same configuration as that of the first actuator 27a. The first actuator 27b is constituted by a coil 33d provided to the coil support frame 13, a magnet 34d provided to the arm part 22d of the movable frame 22, and so on.

In such a configuration, when energizing the coil 33c, the magnetic field generated by a current flowing through the coil 33c repels or attracts the magnet 341 and the magnet 342 to thereby drive the first actuator 27a to oscillate the magnet 34c side in the movable frame 22 centering on the oscillation axis J1 (FIG. 4). On this occasion, the first actuator 27b has a configuration of being driven in the same direction as that of the rotation vector of the first actuator 27a centering on the oscillation axis J1 (FIG. 4). Thus, it is possible to ensure the driving force sufficient to oscillate the movable frame 22, and thus, it is possible to realize a reliable oscillation.

Going back to FIG. 4, it should be noted that in the present embodiment, there is adopted a so-called "moving magnet type" in which the magnets 34c, 34d are provided to the movable frame 22, and the coils 33c, 33d are provided respectively to the coil support frames 12, 13 coupled to the outer frame 24, in other words, the magnets are provided to the movable part. Thus, it becomes difficult for the heat which is generated in the coils 33c, 33d when energized to be transferred to the movable frame 22 and the glass plate 21, and therefore, it is possible to suppress a variation in resonance frequency, a distortion of the glass plate 21, and so on due to the heat.

The coil support frame 13 is a frame member made of metal similar to the coil support frame 12, and forms a substantially rectangular shape in a plan view. On the long side at the movable frame 22 side in the coil support frame 13, there is disposed the coil 33d of the first actuator 27b. At both sides closer to the short side of the coil support frame 13, there are respectively disposed the second actuators 28a, 28b.

The second actuator 28a is an actuator substantially the same in configuration as the first actuator 27a described using FIG. 5, and is constituted by a coil 33a, a magnet 34a which is disposed so as to face the coil 33a at a distance, and so on. The coil 33a is provided to a coil frame made of metal rising from the outer frame 24 toward the Z-axis direction.

The magnet 34a is attached to a magnet frame made of metal rising toward the Z-axis direction at the other end 23c side of a first frame 23a of the inner frame 23. It should be noted that the inner frame 23 is branched into two frames, namely the first frame 23a at the support part 22a side of the movable frame 22, and a second frame 23b at the support part 22b side thereof.

The first frame 23a extends from one end of a portion overlapping the coil support frame 12 along an outer circumference of the movable frame 22, and the other end 23c reaches the vicinity of the coil support frame 13. Further, the first frame 23a is coupled to the support part 22a in the middle of an extending portion along the outer circumference of the movable frame 22. Further, at the other end 23c side of the first frame 23a, there is disposed the magnet 34a.

The second actuator 28b forming a pair with the second actuator 28a is substantially the same in configuration as the second actuator 28a, and is constituted by a coil 33b, a magnet 34b which is disposed so as to face the coil 33b at a distance, and so on.

The magnet 34b is attached to a magnet frame made of metal rising toward the Z-axis direction at the other end 23d side of the second frame 23b of the inner frame 23. The second frame 23b extends from one end of a portion overlapping the coil support frame 12 along the outer circumference of the movable frame 22, and the other end 23d reaches the vicinity of the coil support frame 13. Further, the second frame 23b is coupled to the support part 22b in the middle of an extending portion along the outer circumference of the movable frame 22. Further, the magnet 34b is attached to the magnet frame made of metal rising toward the Z-axis direction at the other end 23d side of the second frame 23b.

It should be noted that in the second actuators 28a, 28b, there is adopted the moving magnet type in which the magnet is provided to the inner frame 23 side to be the movable part.

The second actuators 28a, 28b are each an actuator substantially the same in configuration as the first actuators 27a, 27b, but are each designed so as to be longer in drive surface than the first actuators 27a, 27b in order to increase the excitation force compared to the first actuators 27a, 27b.

The drive surface means a portion where the coil and the magnet face each other, and for example, the length of the drive surface in the extending direction of the Y axis formed of the coil 33a of the second actuator 28a and the magnet 34a is designed to be more than double of the length of the drive surface in the extending direction of the X axis formed of the coil 33c of the first actuator 27a and the magnet 34c. It should be noted that the same applies to the second actuator 28b and the first actuator 27b.

The reason that the drive surfaces of the second actuators 28a, 28b are set longer is that the drive force for oscillating the whole of the movable frame 22 in addition to the first frame 23a and the second frame 23b is required for the two actuators.

In such a configuration, when applying a drive waveform to the coils 33a, 33b of the second actuators 28a, 28b, the magnetic field generated by the current flowing through the coils repels or attracts the magnets 34a, 34b to thereby oscillate the whole of the inner frame 23 including the movable frame 22 in the second oscillation direction centering on the second oscillation axis J2.

The second actuators 28a, 28b are set higher in excitation force than the first actuators 27a, 27b as described above in order to oscillate the whole of the inner frame 23 including the movable frame 22 via the second oscillation axis J2. Therefore, in order to suppress the vibration when performing the excitation drive, there is disposed a plurality of coupling sections on the periphery of each of the second actuators 28a, 28b.

Specifically, on the periphery of the second actuator 28a, there are disposed three coupling sections, namely the coupling section 29a, the coupling section 29b, and the coupling section 29g, so as to form a truss configuration. Similarly, on the periphery of the second actuator 28b, there are also disposed three coupling sections, namely the coupling section 29e, the coupling section 29f, and the coupling section 29g, so as to form a truss configuration. It should be noted that the coupling section 29b, the coupling section 29e, and the coupling section 29g also function as a support of the first actuator 27b, and surround the actuator from three directions. Further, at both sides of the first actuator 27a, there are also disposed the two coupling sections, namely the coupling section 29c and the coupling section 29d.

Here, for example, the distance between the second actuator 28a and the coupling section 29a is set shorter than the distance between the first actuator 27b and the coupling section 29b. The same applies to the rest of the coupling sections. This is because it is required to dispose the coupling sections closer to suppress the vibration in the second actuators 28a, 28b high in excitation force. In other words, out of the shortest distances between each of the coupling sections and the first actuator 27b and the second actuator 28a, there is provided the coupling section 29a the distance of which from the second actuator 28a is shorter than the distance between the other coupling section 29b and the first actuator 27b.

\*\*\*Detailed Configuration of Coupling Section\*\*\*

Figure 6:
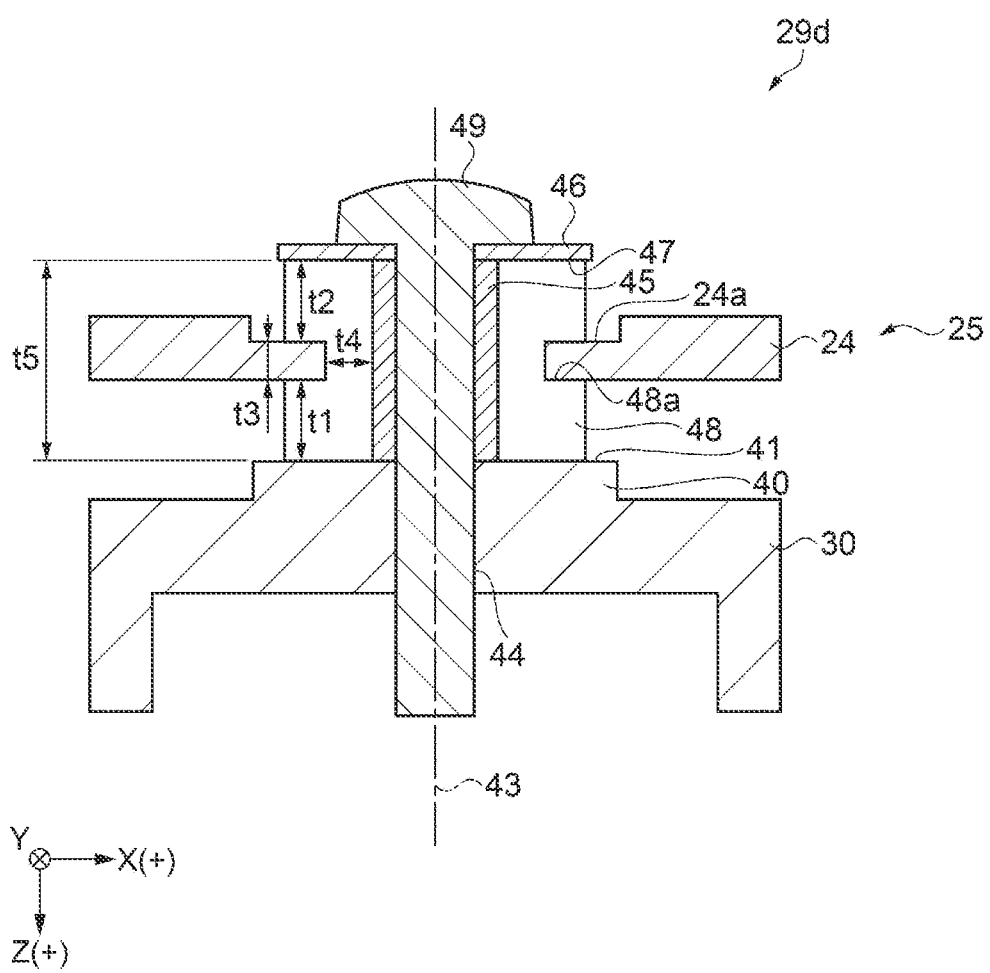
FIG. 6 is a sectional side view of a joint part.

FIG. 6 is a sectional side view of the coupling section. In particular, FIG. 6 is a cross-sectional view in a g-g' cross-sectional surface in the coupling section 29d in FIG. 4. It should be noted that the rest of the coupling sections 29a through 29c and the coupling sections 29e through 29g are the same in structure as the coupling section 29d.

Here, the configuration of each of the coupling sections 29a through 29g at the seven places will be described using the coupling section 29d as a representative, but regarding common contents, the seven coupling sections will collectively be described as the coupling sections 29 in some cases.

The coupling section 29d is constituted by a spacer 45 as a shaft part, a vibration absorbing member 48, a washer 46, a screw 49, and so on.

In a portion overlapping the coupling section 29d in the stationary frame 30, there is disposed a pedestal part 40 shaped like a ring one step higher than the surrounding. At the center of the pedestal part 40, there is formed a screw hole 44. The surface provided with the screw hole 44 in the pedestal part 40 is referred to as a first surface 41. On the pedestal part 40, there is disposed the spacer 45. In the preferred example, the spacer 45 is a spacer made of stainless steel, and is shaped like a circular tube having a through hole. It should be noted that a material light in weight and high in strength is sufficient, and for example, a spacer made of iron, an alloy, or resin can be adopted. Further, a line segment extending from the center of the screw hole 44 along the Z axis is defined as a central axis 43.

The central axis 43 is a central axis of the coupling section 29d, and is also a central axis of the spacer 45, the vibration absorbing member 48, the washer 46, and the screw 49.

On the periphery of the spacer 45, there is attached the vibration absorbing member 48. The vibration absorbing member 48 is a member shaped like a circular tube, and a recessed part 48a shaped like a ring to be coupled to the outer frame 24 is formed on the outer circumference of the vibration absorbing member 48. A coupling part 24a of the outer frame 24 is fitted in the recessed part 48a shaped like a ring. The coupling part 24a is a recessed part shaped like a circular ring formed thinner than a surrounding region in the outer frame 24. It should be noted that the coupling part 24a is set to have the thickness t3 with which the strength capable of stably supporting the optical device 20 can be ensured although the coupling part 24a is thinner than the surrounding. Further, the vibration absorbing member 48 is formed of a resin material. In the preferred example, the vibration absorbing member 48 is formed by injection-molding styrene series resin.

On the spacer 45 and the vibration absorbing member 48, there is disposed the washer 46. In the preferred example, as the washer 46, there is used a washer made of stainless steel. It should be noted that a material light in weight and high in strength is sufficient, and for example, a spacer made of iron, an alloy, or resin can be adopted. A surface at the vibration absorbing member 48 side in the washer 46 is referred to as a second surface 47.

Further, fixation with the screw 49 is made on the washer 46. The washer 49 is a pan-head screw made of metal, and is screwed together with the screw hole 44 of the stationary frame 30 via the washer 46 and the spacer 45.

In such a manner, with the coupling sections 29a through 29g at the seven places, the coupling frame 25 for supporting the optical device 20 is fixed to the stationary frame 30 via the vibration absorbing member 48.

Further, the stationary frame 30 has the spacer 45 as the shaft part to which the vibration absorbing member 48 is attached, the first surface 41 of the stationary frame 30 and the second surface 47 of the washer 46 opposed to each other outside the spacer 45. The coupling frame 25 is disposed so as to be separated from the spacer 45 as the shaft part, the first surface 41, and the second surface 47 with the vibration absorbing member 48.

\*\*\*Dimension Setting and Specification Setting in Preferred Example\*\*\*

Dimension setting of the periphery of the vibration absorbing member 48 in the preferred example will be described using FIG. 6.

The dimension setting and the specification setting described below are preferable setting cases when setting the weight of the optical device 20 no lower than 40 gf and no higher than 70 gf, and setting the frequency of the drive signal for reciprocally driving the movable frame 22 no lower than 40 Hz and no higher than 70 Hz. When these prerequisites are different, the dimensions and the specifications described below are not a limitation.

First, the height t5 of the spacer 45 is assumed to be about 6.4 mm, and the outside diameter thereof is assumed to be about 4 mm.

The initial height of the vibration absorbing member 48 is about 6.55 mm, and the vibration absorbing member 48 is compressed by the screw 49 between the first surface 41 and the second surface 47. In other words, the initial height of the vibration absorbing member 48 is set larger than the length in a direction parallel to the central axis 43 of the spacer 45 as the shaft. It is desirable to set the initial height so that an amount to be compressed becomes within a range of no smaller than about 0.1 mm and no larger than about 0.2 mm.

The initial inside diameter of the vibration absorbing member 48 is about 3.9 mm, and is set smaller than the outside diameter of the spacer 45. The spacer 45 is inserted so as to substantially be press-fitted so as to enlarge the inside diameter of the vibration absorbing member 48 having elasticity. The initial outside diameter of the vibration absorbing member 48 is set to about 9.5 mm.

The width of the recessed part 48a of the vibration absorbing member 48 is set to about 1.2 mm. The thickness t3 of the coupling part 24a of the outer frame 24 to be fitted in the recessed part 48a is also set to about 1.2 mm. The width of the recessed part 48a and the thickness t3 of the coupling part 24a are the same in dimension, and are therefore, easy to fit in, and after the fixation with the screw 49, the vibration absorbing member 48 is pressure-contacted, and thus, the recessed part 48a and the coupling part 24a more tightly adhere to each other.

The thickness t1 of the vibration absorbing member 48 between the first surface 41 of the stationary frame 30 and the coupling part 24a of the outer frame 24 is assumed to be about 2.6 mm.

The thickness t2 of the vibration absorbing member 48 between the coupling part 24a of the outer frame 24 and the second surface 47 of the washer 46 is assumed to be about 2.6 mm.

The thickness t4 of the vibration absorbing member 48 between the outline of the spacer 45 and the coupling part 24a of the outer frame 24 is assumed to be about 1.5 mm.

The screw 49 is an external thread of M3, and the screw hole 44 of the pedestal part 40 is provided with an internal thread of M3.

In an assembling process of the coupling section 29 in the preferred example, first, the spacer 45 is inserted into the vibration absorbing member 48. Subsequently, the vibration absorbing member 48 which has been integrated with the spacer 45 is fitted into the coupling part 24a of the outer frame 24 using the elasticity of the vibration absorbing member 48. This process is performed in the coupling sections 29 at the seven places. The coupling frame 25 in the state in which the vibration absorbing member 48 including the spacer 45 is attached to each of the seven places is mounted on the stationary frame 30, then the washer 46 is set to each of the seven places, and then the screws 49 are tightened. It should be noted that on this occasion, the movable frame 22, the first actuators 27a, 27b, the second actuators 28a, 28b are incorporated in the coupling frame 25.

Then, the specifications of the vibration absorbing member 48 in the preferred example will be described.

It is preferable for the vibration absorbing member 48 to be a resin material no lower than 20 in durometer hardness and no higher than R95 in Rockwell hardness. Further, it is preferable for the hardness change with temperature of the vibration absorbing member 48 to be lower than 1% per ° C. in a range of 0° C. through 100° C. It should be noted that the grounds of the above will be described later.

It should be noted that the preferred case described above is not a limitation, and it is sufficient to fulfill the following relationship.

The thickness t1 of the vibration absorbing member 48 existing between the coupling frame 25 and the first surface 41 of the stationary frame 30, and the thickness t2 of the vibration absorbing member 48 existing between the coupling frame 25 and the second surface 47 of the washer 46 are larger than the thickness t4 of the vibration absorbing member 48 existing between the coupling part 24a of the outer frame 24 and the spacer 45.

Further, at least one of the thickness of the vibration absorbing member 48 existing between the coupling frame 25 and the first surface 41 of the stationary frame 30, and the thickness of the vibration absorbing member 48 existing between the coupling frame 25 and the second surface 47 of the washer 46 is larger than the thickness t4 of the vibration absorbing member 48 existing between the coupling part 24a of the outer frame 24 and the spacer 45. In other words, at least one of the thickness t1 and the thickness t2 is larger than the thickness t4.

Further, at least one of the thickness of the vibration absorbing member 48 existing between the coupling frame 25 and the first surface 41 of the stationary frame 30, and the thickness of the vibration absorbing member 48 existing between the coupling frame 25 and the second surface 47 of the washer 46 is larger than the thickness t3 of the coupling part 24a of the outer frame 24 in the direction parallel to the spacer 45. In other words, at least one of the thickness t1 and the thickness t2 is larger than the thickness t3.

Further, the thickness t4 of the vibration absorbing member 48 existing between the coupling part 24a of the outer frame 24 and the spacer 45 is larger than the thickness t3 of the coupling part 24a of the outer frame 24 in the direction parallel to the spacer 45. In other words, the thickness t4 is larger than the thickness t3.

*Verification of Advantage Of Vibration Absorbing Member*

Figure 7:
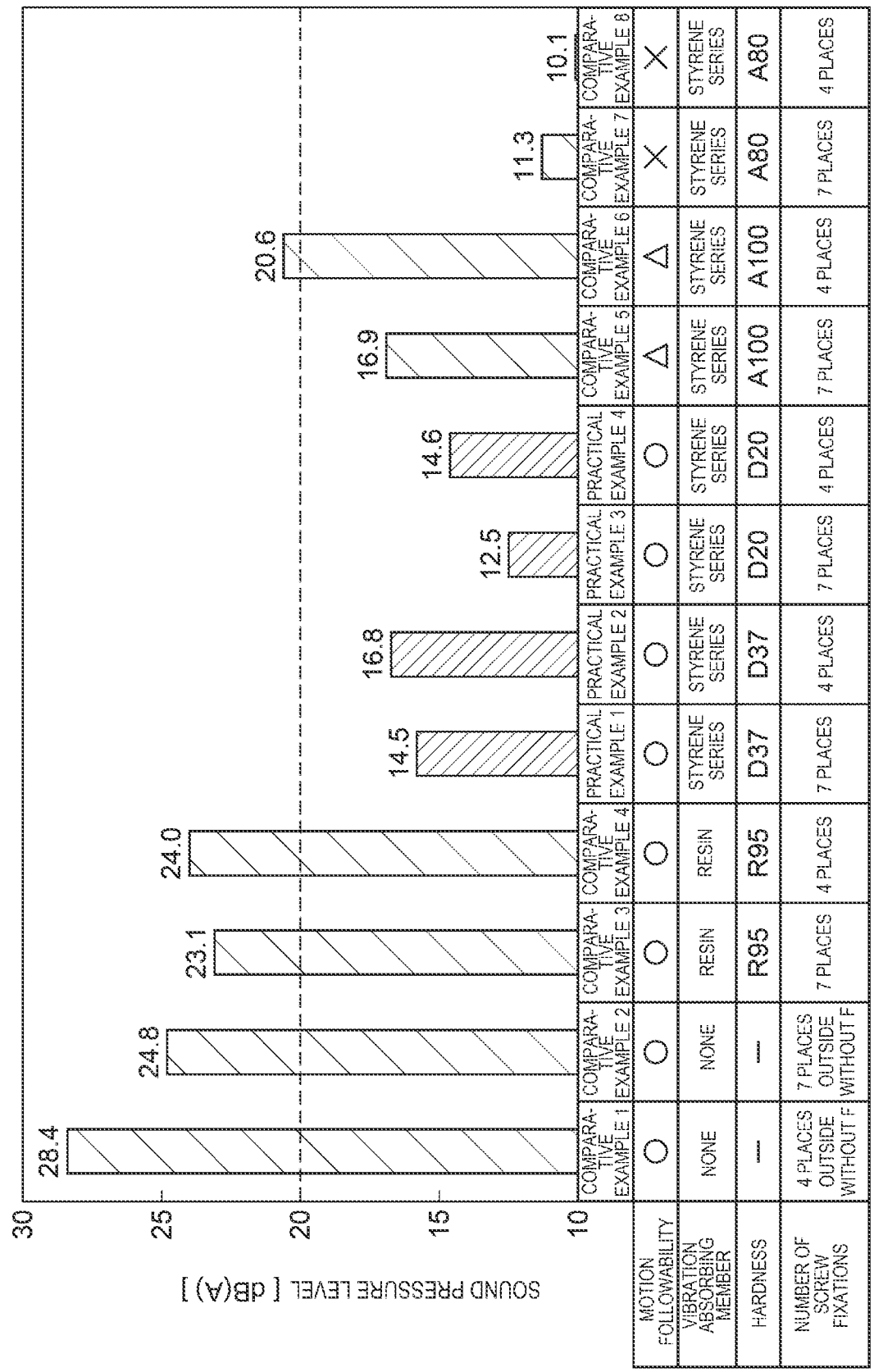
FIG. 7 is a chart showing a verification result related to a noise level with a vibration-proof structure using a vibration absorbing member, and motion followability.

FIG. 7 is a chart showing a verification result related to a noise level with a vibration-proof structure using the vibration absorbing member, and motion followability.

In the verification, there was conducted an experiment using four practical examples and eight comparative examples with the hardness of the vibration absorbing member 48, the number of coupling sections 29, and so on changed.

As a result, as shown in FIG. 7, a good result was obtained in both of the noise level and the motion followability regarding the four practical examples, namely Practical Example 1 through Practical Example 4.

On the other hand, there was obtained the result that the noise level exceeded an index to show high noise although the motion followability was good (0) regarding Comparative Example 1 through Comparative Example 4. Regarding Comparative Example 5 and Comparative Example 6, there was obtained the result that the motion followability was unstable (A) although the noise level was in an acceptable level. Regarding Comparative Example 7 and Comparative Example 8, there was obtained the result that the motion followability was poor (x) although the noise level was good.

Figure 8:
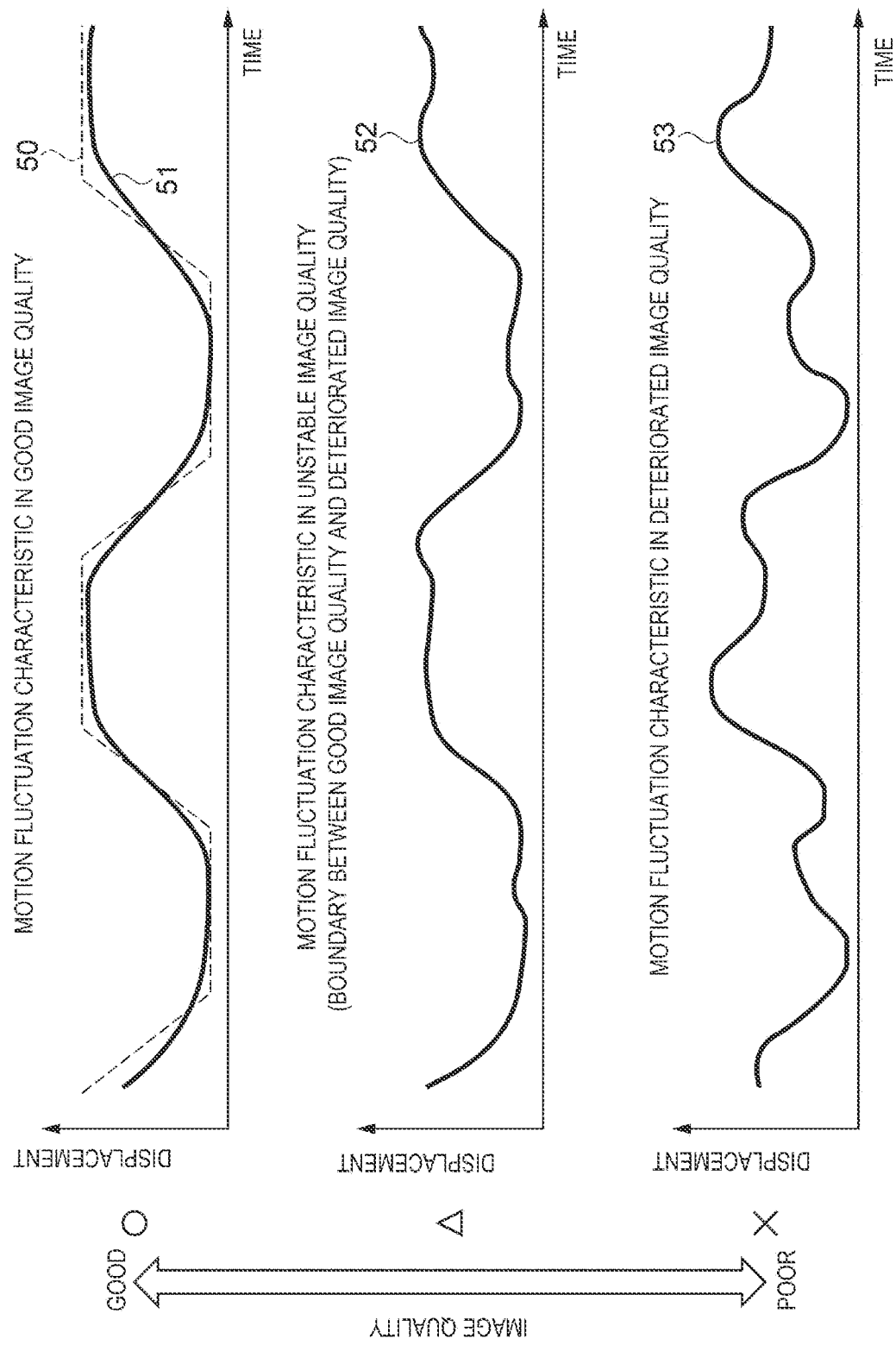
FIG. 8 is a graph chart for explaining dominance in motion followability.

FIG. 8 is a graph chart for explaining dominance in the motion followability.

First, the dominance in the motion followability will be described using FIG. 8.

The graph 50 formed of a trapezoidal wave represented by a dotted line shows an ideal motion of the movable frame 22 (the glass plate 21). It should be noted that the vertical axis represents a displacement in the reciprocal motion, and the horizontal axis represents a time axis. The ideal reciprocal motion of the movable frame 22 is a motion in which the time corresponding to the straight line portion in the lower base in the trapezoidal wave is long, the rising time is short, the time corresponding to the straight line in the upper base is long, and the falling time is short. Further, it is desirable that a rippling motion in the upper base and the lower base such as overshoot following the rising edge or undershoot following the falling edge is small. In other words, providing the movable frame 22 smoothly moves without fluttering and time when the movable frame 22 stops in a stable state in the lower base and the upper base can be kept for a long time when the movable frame 22 makes the reciprocal motion, it is possible to obtain the projection image good in image quality and high in resolution.

The graph 51 represented by a solid line in FIG. 8 shows a motion trajectory example obtained in the practical examples and the comparative examples the motion followability of which is expressed as good (o) in FIG. 7. As shown in FIG. 8, the graph 51 shows the motion trajectory substantially along the graph 50 of the ideal trapezoidal wave, and a good image quality can be obtained.

The graph 53 in the lowest column in FIG. 8 shows a motion trajectory example obtained in the comparative examples the motion followability of which is expressed as poor (x) in FIG. 7. As shown in FIG. 8, since the trapezoidal wave is significantly deformed in the graph 53, the image quality deteriorates.

The graph 52 in a middle column in FIG. 8 shows a motion trajectory example obtained in the comparative examples the motion followability of which is expressed as unstable (Δ) in FIG. 7. As shown in FIG. 8, since the graph 52 has a waveform in an intermediate state between the graph 51 and the graph 53, the image quality becomes unstable.

Figure 9:
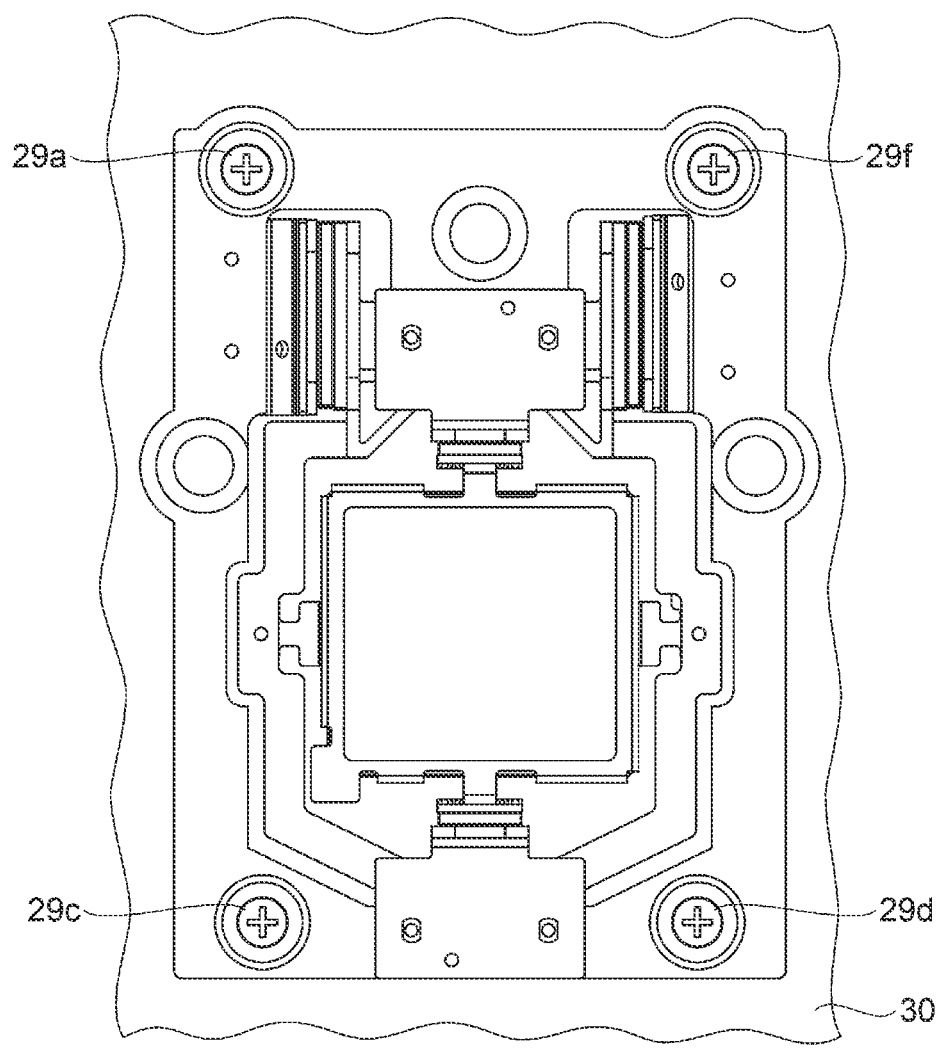
FIG. 9 is a plan view of an optical device with screw fixation at four places.

FIG. 9 is a plan view of an optical device with the screw fixation at four places.

Then, the contents and the verification result of the four practical examples and the eight comparative examples will be described in detail.

First, in Practical Example 1, styrene series resin with the durometer hardness of 37 is used as the vibration absorbing member 48 shown in FIG. 6. Further, as in the aspect shown in FIG. 4, there is used a sample in which the optical device 20 is screw-fixed in the coupling sections 29a through 29g at the seven places.

In Practical Example 2, the styrene series resin with the durometer hardness of 37 is used as the vibration absorbing member 48 similarly to Practical Example 1. Further, as shown in FIG. 9, there is used a sample in which the optical device 20 is screw-fixed in the coupling sections 29a, 29c, 29d, and 29f at four places. Practical Example 1 and Practical Example 2 are different in the number of screw fixations from each other.

In Practical Example 3, styrene series resin with the durometer hardness of 20 is used as the vibration absorbing member 48. Further, there is used a sample in which the optical device 20 is screw-fixed in the coupling sections 29a through 29g at the seven places.

In Practical Example 4, the styrene series resin with the durometer hardness of 20 is used as the vibration absorbing member 48. Further, there is used a sample in which the optical device 20 is screw-fixed in the coupling sections 29a, 29c, 29d, and 29f at the four places. Practical Example 3 and Practical Example 4 are different in the number of screw fixations from each other.

Figure 10:
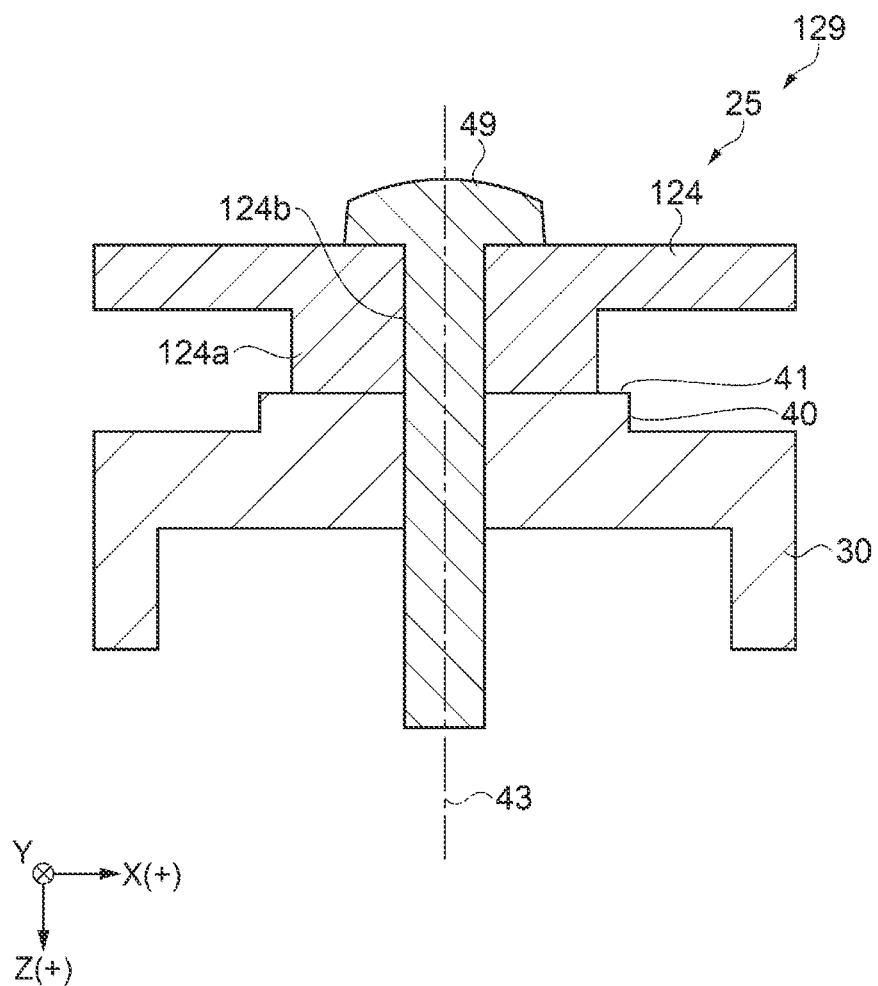
FIG. 10 is a cross-sectional view of a joint part in Comparative Example 1 and Comparative Example 2.

FIG. 10 is a cross-sectional view of the coupling section in Comparative Example 1 and Comparative Example 2, and corresponds to FIG. 6.

First, Comparative Example 2 is different in structure of the coupling section, and has a coupling section 129 for a comparative evaluation. In particular, as shown in FIG. 10, in the coupling section 129, the vibration absorbing member, the spacer, and the washer are not used, but a coupling frame 125 for the comparative evaluation is used alone. The stationary frame 30 is the same as shown in FIG. 6. A coupling part 124a of an outer frame 124 of the coupling frame 125 is a pedestal part having a cylindrical shape protruding toward the positive Z direction, and a through hole 124b in which the screw 49 is inserted is disposed at the center of the coupling part 124a. The coupling part 124a of the outer frame 124 has a structure of directly coupled to the pedestal part 40 of the stationary frame 30, and the coupling part 124a and the pedestal part 40 are directly fixed to each other with the screw 49. The screw fixation is made at the seven places.

Figure 11:
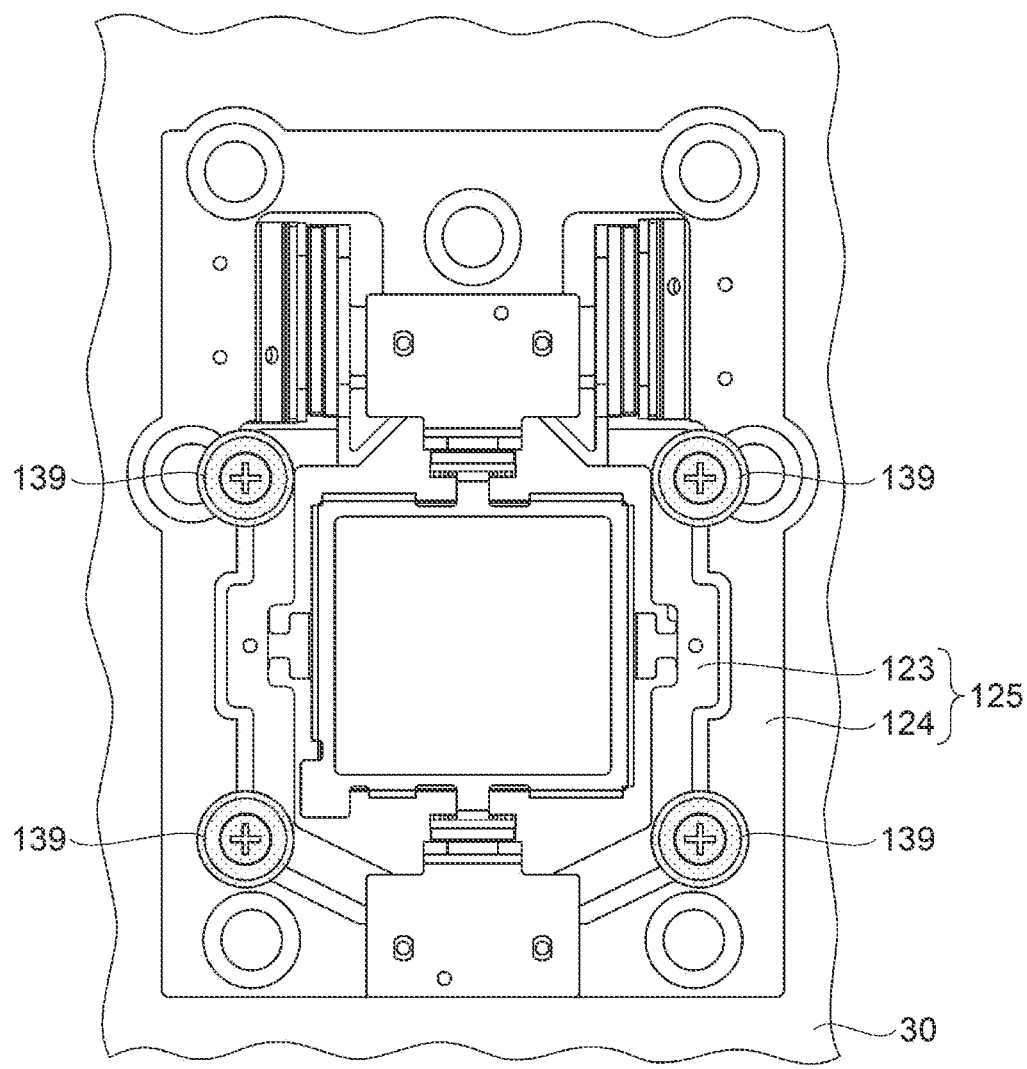
FIG. 11 is a plan view of an optical device according to Comparative Example 1.

FIG. 11 is a plan view of the optical device in Comparative Example 1, and corresponds to FIG. 4.

As shown in FIG. 11, in Comparative Example 1, an inner frame 123 of the coupling frame 125 is directly fixed to the stationary frame 30 with coupling sections 139 at four places for the comparative evaluation. The positions of the coupling sections 139 are portions overlapping the inner frame 123 at the outer side of the four vertexes of the movable frame 22. The cross-sectional structure of the coupling section 139 is the same as that of the coupling section 129 shown in FIG. 10.

In Comparative Example 1, it is possible to investigate an influence when a cushioning action by the outer frame does not exist in the double annular structure with the inner frame 23 and the outer frame 24.

In Comparative Example 3, fluorocarbon resin with the Rockwell hardness of R95 is used as the vibration absorbing member 48. It should be noted that it is possible to use other resin with the same hardness. Further, there is used a sample in which the optical device 20 is screw-fixed in the coupling sections 29a through 29g at the seven places.

In Comparative Example 4, fluorocarbon resin with the Rockwell hardness of R95 is used as the vibration absorbing member 48. It should be noted that it is possible to use other resin with the same hardness. Further, there is used a sample in which the optical device 20 is screw-fixed in the coupling sections 29a, 29c, 29d, and 29f at the four places. Comparative Example 3 and Comparative Example 4 are different in the number of screw fixations from each other.

In Comparative Example 5, the styrene series resin with Asker hardness of 100 is used as the vibration absorbing member 48. Further, there is used a sample in which the optical device 20 is screw-fixed in the coupling sections 29a through 29g at the seven places. It should be noted that the reason that the three indexes, namely the Rockwell hardness, the durometer hardness, and the Asker hardness, are used as the hardness indexes is that the hardness range of the vibration absorbing member 48 used in the present verification cannot be covered by a measurement range in one index. The hardness of the vibration absorbing member 48 in the present verification is the highest in Comparative Example 3 and Comparative Example 4, decreases in the order of Practical Example 1 and Practical Example 2, Practical Example 3 and Practical Example 4, and Comparative Example 5 and Comparative Example 6 in a stepwise manner, and is the lowest in Comparative Example 7 and Comparative Example 8.

In Comparative Example 6, the styrene series resin with the Asker hardness of 100 is used as the vibration absorbing member 48. Further, there is used a sample in which the optical device 20 is screw-fixed in the coupling sections 29a, 29c, 29d, and 29f at the four places. Comparative Example 5 and Comparative Example 6 are different in the number of screw fixations from each other.

In Comparative Example 7, the styrene series resin with the Asker hardness of 80 is used as the vibration absorbing member 48. Further, there is used a sample in which the optical device 20 is screw-fixed in the coupling sections 29a through 29g at the seven places.

In Comparative Example 8, the styrene series resin with the Asker hardness of 80 is used as the vibration absorbing member 48. Further, there is used a sample in which the optical device 20 is screw-fixed in the coupling sections 29a, 29c, 29d, and 29f at the four places. Comparative Example 7 and Comparative Example 8 are different in the number of screw fixations from each other.

*Consideration Based on Verification Result*

Going back to FIG. 7, in the graphs shown in FIG. 7, the vertical axis represents the sound pressure (dB) indicating the noise level, and the horizontal axis represents the comparative examples and the practical examples. The index of the noise level is about 20 dB, and when the noise level is no higher than the index, it is judged that the noise is low, and is therefore good.

As described above, regarding the four practical examples, namely Practical Example 1 through Practical Example 4, a good result was obtained in both of the noise level and the motion followability.

When considering mainly the noise level, it is understood that the noise level exceeds the noise index of 20 dB, and the vibration and the noise due to the vibration become high in Comparative Example 1 and Comparative Example 2 having no vibration absorbing member, and Comparative Example 3 and Comparative Example 4 using the fluorocarbon resin as the vibration absorbing member 48. On the other hand, in all of Comparative Example 1 through Comparative Example 4, the motion followability is good (o).

In Comparative Example 1 and Comparative Example 2, the sound pressure in Comparative Example 2 is 24.8 dB which is suppressed as much as about 3.6 dB from the sound pressure in Comparative Example 1 of 28.4 dB, and thus, a distinct noise suppression effect is observed. It is conceivable that this is due to the cushioning action by the outer frame 24 in the double annular structure of the coupling frame 25 constituted by the inner frame 23 and the outer frame 24.

Further, in Comparative Example 3 and Comparative Example 4, the sound pressure in Comparative Example 3 is 23.1 dB which is suppressed as much as about 0.9 dB from the sound pressure in Comparative Example 4 of 24.0 dB, and thus, a noise suppression effect is observed. This is due to the difference in number of screw fixations, and it is understood that the seven-fixation configuration is higher in noise suppression effect than the four-fixation configuration. Substantially the same result is obtained in other practical examples and other comparative examples, and for example, in Practical Example 1, the sound pressure is suppressed as much as about 2.3 dB compared to Practical Example 2, and thus, a distinct effect is observed.

It should be noted that in Practical Example 2 and Practical Example 4, the noise level is lower than the noise index even when the number of the screw fixations is four, and therefore, it is recognized that the four-screw fixation configuration is of practical use. In other words, it is sufficient for the number of coupling sections 29 to be no smaller than 4 and no larger than 7.

Further, the noise level in Comparative Example 3 is higher than the noise index as much as about 3 dB, but is only slightly higher, and on the other hand, taking the excellent motion followability into consideration, it is conceivable that the noise level in Comparative Example 3 is within the allowable range in practical use. In other words, Comparative Example 3 can be assumed as a quasi-practical example. Therefore, the upper limit of the hardness of the vibration absorbing member 48 is set to R95 in the Rockwell hardness. Further, the lower limit of the hardness of the vibration absorbing member 48 becomes 20 in the durometer hardness of Practical Example 3 and Practical Example 4 in which the good result was obtained in both of the noise level and the motion followability.

In Comparative Example 5 and Comparative Example 6, the noise level becomes high despite the fact that the vibration absorbing member 48 lower in hardness than in Practical Example 3 and Practical Example 4 is used. It is assumed that this was caused by the fact that the whole of the optical device 20 resonated.

In Comparative Example 7 and Comparative Example 8, the noise level becomes the lowest, but the motion followability is poor, and thus, the practicality is poor.

Figure 12:
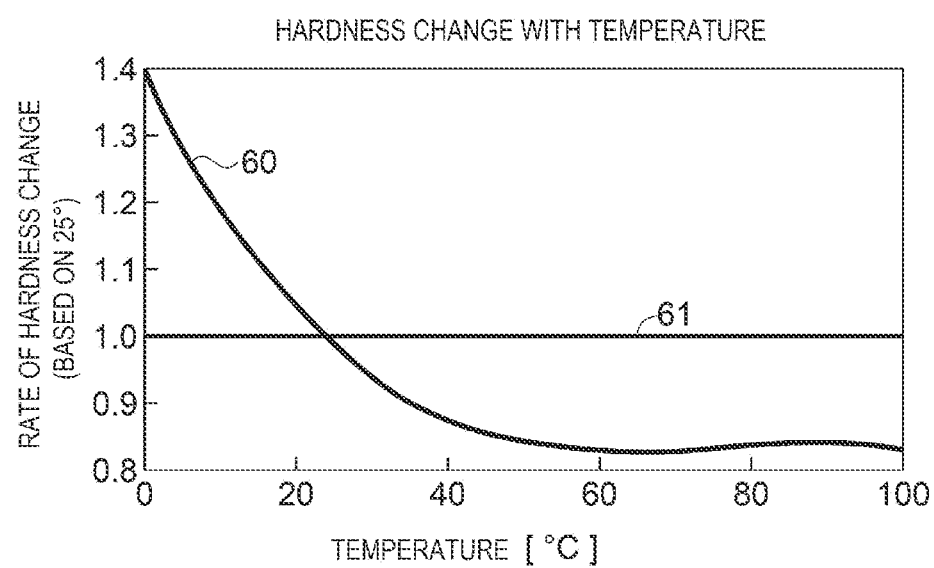
FIG. 12 is a graph chart showing a temperature characteristic of hardness in the vibration absorbing member.

FIG. 12 is a graph chart showing a temperature characteristic of the hardness in the vibration absorbing member.

In the above, the verification is performed by changing the hardness of the vibration absorbing member 48 in the room temperature (15° C. through 25° C.), but it is required for the vibration absorbing member 48 that the hardness is stable under the environment in which the projector 1 is used. The rated operation temperature of a typical projector is in a range of 0° C. through 50° C., but since the optical device 20 is disposed in the vicinity of the light modulation device 4 (FIG. 1) which rises in temperature, it is safer to have a margin at the high temperature side.

The graph 60 shown in FIG. 12 represents the temperature characteristic of silicone resin as a comparative example, wherein the horizontal axis represents the temperature (° C.), and the vertical axis represents a rate of hardness change (%).

It is understood that in the case of the silicone resin described in a related art document (Document 1), the rate of hardness change in a range of 0° C. through 60° C. is extremely high as represented by the graph 60. This temperature range overlaps the rated operation temperature of the projector, and when using the silicone resin as the vibration absorbing member 48, since the hardness is not stabilized, there is a possibility that the noise increases, or the motion followability becomes unstable.

In contrast, in the graph 61 representing the temperature characteristic of the styrene series resin adopted in the practical example, the rate of the hardness change in a range of 0° C. through 100° C. does not change but is kept at 1.0. Therefore, when using the styrene series resin as the vibration absorbing member 48, since the hardness at the room temperature can be kept in the temperature range having a margin at the high temperature side including the rated operation temperature of the projector, it is possible to keep the good state in both of the noise level and the motion followability. It should be noted that the styrene series resin is not a limitation, and it is sufficient to be resin having an equivalent temperature characteristic.

As described hereinabove, according to the optical device 2 and the projector 1 related to the present embodiment, the following advantages can be obtained.

The optical device 2 includes the optical device 20 including the glass plate 21 having the plane of incidence which the light enters, the movable frame 22 for holding the glass plate 21, and the coupling frame 25 to be coupled to the movable frame 22 via the first oscillation axis J1, and the stationary frame 30 for fixing the coupling frame 25 in the optical device 20 via the vibration absorbing member 48, wherein the stationary frame 30 has the spacer 45 as the shaft part to which the vibration absorbing member 48 is attached, the first surface 41 of the pedestal part 40 and the second surface 47 of the washer 46 opposed to each other outside the spacer 45, the coupling frame 25 is disposed so as to be separated from the spacer 45, the first surface 41, and the second surface 47 with the vibration absorbing member 48, and at least one of the thickness of the vibration absorbing member 48 existing between the coupling frame 25 and the first surface 41 of the stationary frame 30, and the thickness of the vibration absorbing member 48 existing between the coupling frame 25 and the second surface 47 is larger than the thickness of the vibration absorbing member 48 existing between the coupling frame 25 and the spacer 45 of the stationary frame 30.

According to the above, the coupling frame 25 for supporting the movable frame 22 for performing the reciprocal drive is disposed so as to be separated from the spacer 45, the first surface 41, and the second surface 47 with the vibration absorbing member 48, and can therefore absorb the micro vibrations which do not affect the accuracy of the reciprocal drive.

Further, since at least one of the thickness t1 of the vibration absorbing member 48 between the coupling part 24a of the outer frame 24 and the first surface 41, and the thickness t2 of the vibration absorbing member 48 between the coupling part 24a and the second surface 47 is thicker than the thickness t4 of the vibration absorbing member 48 between the coupling part 24a and the spacer 45, it is possible to ensure the accuracy of the reciprocal drive of the movable frame 22.

Therefore, according to this optical device 2, it is possible to suppress the noise due to the micro vibrations, and at the same time, it is possible to ensure the motion followability of the movable frame 22 with the simple structure in which the spacer 45 and the vibration absorbing member 48 are attached to the stationary frame 30.

Therefore, it is possible to provide the projector 1 as the image display device which is low in noise and can obtain a high-resolution projection image with a simple configuration.

Further, the thickness of the vibration absorbing member 48 existing between the coupling frame 25 and the first surface 41 of the stationary frame 30, and the thickness of the vibration absorbing member 48 existing between the coupling frame 25 and the second surface 47 are larger than the thickness t4 of the vibration absorbing member 48 existing between the coupling part 24a of the outer frame 24 and the spacer 45.

According to the above, since the thickness t1 of the vibration absorbing member 48 between the coupling part 24a of the outer frame 24 and the first surface 41, and the thickness t2 of the vibration absorbing member 48 between the coupling part 24a and the second surface 47 are thicker than the thickness t4 of the vibration absorbing member 48 between the coupling part 24a and the spacer 45, it is possible to suppress the noise, and at the same time, it is possible to ensure the accuracy of the reciprocal drive of the movable frame 22.

Further, at least one of the thickness of the vibration absorbing member 48 existing between the coupling frame 25 and the first surface 41 of the stationary frame 30, and the thickness of the vibration absorbing member 48 existing between the coupling frame 25 and the second surface 47 is larger than the thickness of the coupling frame 25 in the direction parallel to the spacer 45.

According to the above, since at least one of the thickness t1 of the vibration absorbing member 48 between the coupling part 24a of the outer frame 24 and the first surface 41, and the thickness t2 of the vibration absorbing member 48 between the coupling part 24a and the second surface 47 is thicker than the thickness t3 of the coupling part 24a of the outer frame 24, it is possible to suppress the noise, and at the same time, it is possible to ensure the accuracy of the reciprocal drive of the movable frame 22.

Further, the thickness t4 of the vibration absorbing member 48 existing between the coupling frame 25 and the spacer 45 is larger than the thickness t3 of the coupling frame 25 in the direction parallel to the spacer 45.

According to the above, since the thickness t4 between the coupling part 24a of the outer frame 24 and the spacer 45 is thicker than the thickness t3 of the coupling part 24a, it is possible to suppress the noise, and at the same time, it is possible to ensure the accuracy of the reciprocal drive of the movable frame 22.

Further, the vibration absorbing member 48 is no lower than 20 in durometer hardness, and no higher than R95 in Rockwell hardness.

According to the above, since the hardness of the vibration absorbing member 48 is set within the appropriate range, it is possible to suppress the noise, and at the same time, it is possible to ensure the motion followability of the movable frame 22.

Further, the vibration absorbing member 48 is made of a resin material, and the hardness change with temperature of the vibration absorbing member 48 is lower than 1% per ° C. in the range of 0° C. through 100° C.

According to the above, since the vibration absorbing member 48 can keep the hardness at the room temperature in the temperature range having a margin at the high temperature side including the rated operation temperature of the projector, it is possible to keep the good state in both of the noise level and the motion followability.

Further, the vibration absorbing member 48 is longer than the spacer 45 in the direction parallel to the spacer 45, and is compressed between the first surface 41 and the second surface 47 in the stationary frame 30 by the screw 49 disposed in the through hole of the spacer 45.

According to the above, since the vibration absorbing member 48 is compressed between the first surface 41 and the second surface 47 by the screw 49, the adhesiveness with the coupling part 24a of the outer frame 24 increases, and thus, the vibration absorbing member 48 is integrated with the coupling part 24a.

Further, the coupling frame 25 is provided with the outer frame 24 and the inner frame 23 coupled to the first oscillation axis J1 in the inside of the outer frame 24.

According to the above, due to the cushioning action by the outer frame 24 in the double annular structure of the coupling frame 25, it is possible to suppress the noise, and at the same time, it is possible to ensure the motion followability of the movable frame 22.

Further, the weight of the optical device 20 is no lower than 40 gf and no higher than 70 gf, and the number of the coupling sections 29 with which the coupling frame 25 is fixed to the stationary frame 30 via the vibration absorbing member 48 is no smaller than 4 and no larger than According to the above, since the optical device 20 is fixed to the stationary frame 30 with an appropriate number of coupling sections 29, it is possible to suppress the noise, and at the same time, it is possible to ensure the motion followability of the movable frame 22.

Further, there are further provided the first actuators 27a, 27b for driving the movable frame 22 via the first oscillation axis J1, and the second actuators 28a, 28b for driving the movable frame 22 via the second oscillation axis J2 with the higher excitation force than that of the first actuators 27a, 27b, and the coupling sections 29 with which the coupling frame 25 is fixed to the stationary frame 30 via the vibration absorbing member 48 are disposed at a plurality of places, and out of the shortest distances between each of the coupling sections and the first actuators 27a, 27b and the second actuators 28a, 28b, there is included the coupling section 29 the distance of which from the second actuators 28a, 28b is shorter than the distance between other coupling sections 29 and the first actuators 27a, 27b.

For example, the distance between the second actuator 28a and the coupling section 29a is set shorter than the distance between the first actuator 27b and the coupling section 29b. The same applies to the rest of the coupling sections. According to the above, in the second actuators 28a, 28b higher in excitation force, by disposing the coupling sections 29 closer, it is possible to efficiently suppress the vibration.

The projector 1 is provided with the liquid crystal display element 108 provided with the plurality of pixels, the projection optical device 3 for projecting the light from the liquid crystal display element 108, and the optical device 2 which the light from the liquid crystal display element 108 enters.

According to the above, the projector 1 is provided with the optical device 2 which suppresses the noise, and at the same time, ensures the motion followability of the movable frame 22, and has a simple configuration.

Therefore, it is possible to provide the projector 1 which is low in noise and can obtain a high-resolution projection image with a simple configuration.

Embodiment 2

*Different Aspect-1 of Coupling Section*

Figure 13:
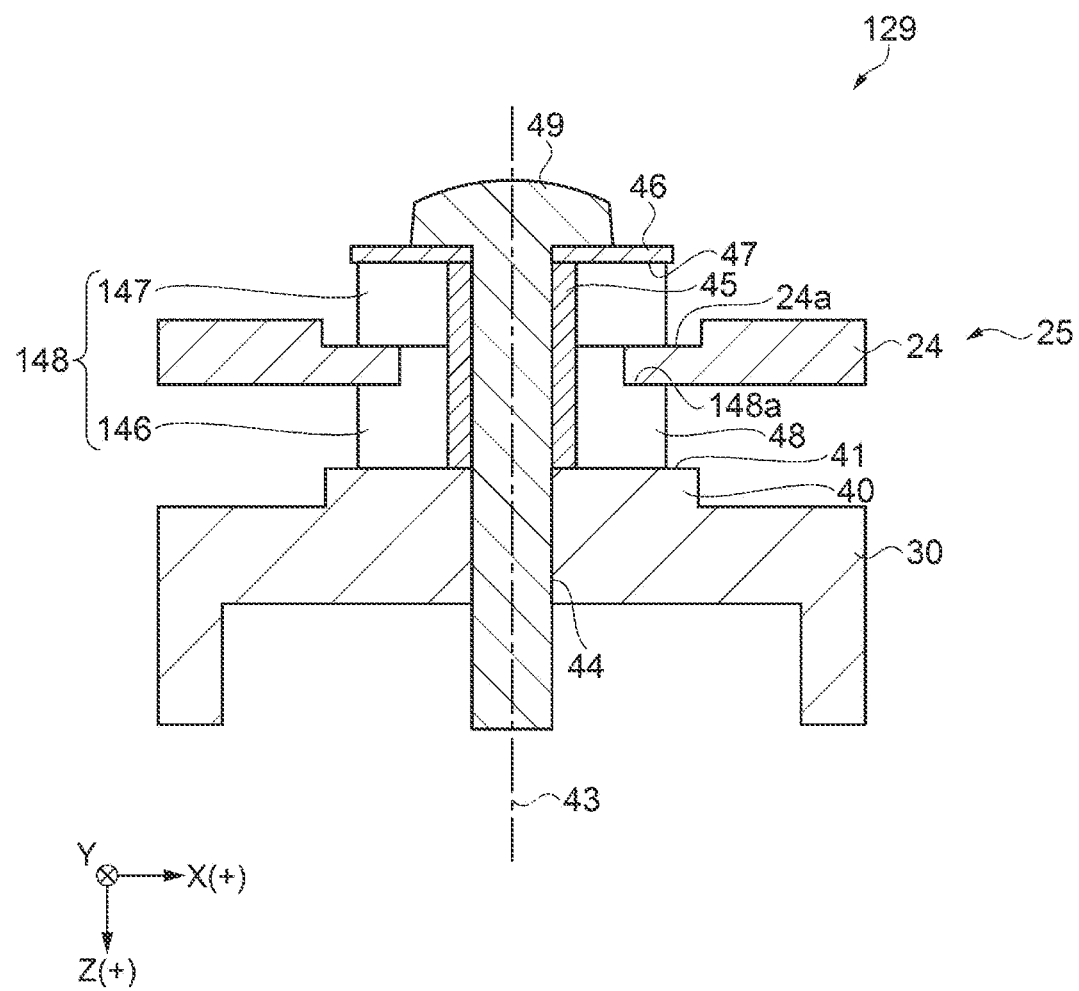
FIG. 13 is a sectional side view of a joint part related to Embodiment 2.

FIG. 13 is a sectional side view of a coupling section in the present embodiment, and corresponds to FIG. 6.

The coupling section 129 in the present embodiment is different from the coupling section 29 in Embodiment 1 in the point that there is provided a vibration absorbing member 148 different from the vibration absorbing member 48 in Embodiment 1. The rest of the configuration is the same as that of the coupling section 29 in Embodiment 1.

Hereinafter, the same constituent regions as in Embodiment 1 are denoted by the same reference numerals, and redundant descriptions will be omitted.

The vibration absorbing member 148 in the present embodiment is constituted by two regions. In particular, the vibration absorbing member 148 is constituted by a first member 146 and a second member 147 stacked on one another, wherein the first member 146 is disposed on the first surface 41 of the pedestal part 40, and the second member 147 is disposed on the second surface 47 of the washer 46.

The material, the dimensions, and the hardness of the first member 146 and the second member 147 are the same as those of the vibration absorbing member 48 in Embodiment 1. For example, when using the styrene series resin, the first member 146 and the second member 147 are separately manufactured in the injection molding. It is possible to impose the first member 146 and the second member 147 in a single metal mold together with each other, or to use dedicated metal molds for the respective members.

The first member 146 is set to have the height from the first surface 41 of the pedestal part 40 to the upper surface of the coupling part 24a of the outer frame 24. In the first member 146, a recessed part 148a located between the spacer 45 and the coupling part 24a is a portion corresponding to the recessed part 48a shaped like a ring in the vibration absorbing member 48 in Embodiment 1, and is cut out to form a stepped shape.

The second member 147 is a member having a simple circular ring-like shape. When the second member 147 is stacked on the first member 146, there is formed the recessed part 148a shaped like a ring which the coupling part 24a fits in.

In the assembling process, first, the spacer 45 is inserted into the first member 146. Then, the first member 146 integrated with the spacer 45 is set in each of the coupling parts 24a located at the seven places in the coupling frame 25. Then, the coupling frame 25 is mounted on the stationary frame.

Subsequently, the spacer 45 projected from the coupling frame 25 is fitted in the second member 147. As described above, when adopting the two-piece configuration, it becomes unnecessary to deform the vibration absorbing member to fit into the outer frame 24.

As described hereinabove, according to the coupling sections 129 and the vibration absorbing members 148, the following advantages can be obtained in addition to the advantages in Embodiment 1.

The vibration absorbing member 148 is the same as the vibration absorbing member 48 in Embodiment 1 except the point that the two-piece configuration is adopted. The coupling section 129 is the same as the coupling section 29 in Embodiment 1 except the point that the vibration absorbing member 148 is used.

Therefore, it is possible to provide the optical device 2 which is capable of suppressing the noise caused by the micro vibrations and at the same time ensuring the motion followability of the movable frame 22 with the simple structure.

Further, by adopting the two-piece configuration with the first member 146 and the second member 147, it becomes unnecessary to deform the vibration absorbing member to fit into the outer frame 24, and therefore, easiness in assembly is enhanced. Since it is possible to achieve the assembly by stacking the components in sequence, the possibility of automatization with a robot or the like increases, and thus, the manufacturing efficiency increases.

Further, the spacer 45 is used in addition to the stationary frame 30 in the above description, but it is possible to integrate the spacer 45 with the stationary frame 30. In particular, it is sufficient to dispose a spacer part shaped like a circular cylinder integrally on the pedestal part 40 when forming the stationary frame 30 from die-casting aluminum. According to the above, it is possible to omit the spacer 45. It should be noted that it is possible to apply this configuration to a configuration using the vibration absorbing member 48 as a single piece shown in FIG. 6.

When adopting these configurations, the spacer part integrally formed plays a role of the spacer 45, and therefore, it is possible to obtain substantially the same functions and the same advantages as in the embodiment described above.

This point will be described using FIG. 4.

In the above description, the description is presented assuming that the movable frame 22 is oscillated in the two directions using the first oscillation axis J1 and the second oscillation axis J2 as the axes to thereby perform the pixel shift as much as a half pixel in each of the F1 direction and the F2 direction (vertical and horizontal directions), the pixel shift in the two directions, namely vertical and horizontal directions, is not a limitation, and it is sufficient to be a method capable of making the display image high in resolution. For example, a single oscillation direction can be adopted. In particular, it is possible to adopt a method of providing a diagonal oscillation axis along a diagonal line of the movable frame 22 to obliquely shift the pixels as much as a half pixel. In this case, a pair of actuators each provided with a magnet and a magnet coil are disposed outside the diagonal oscillation axis. According to this configuration and this method, it is possible to make the display image high in resolution.

Further, in the optical device of the oblique pixel shift type, it is possible to apply the vibration-proof structure using the coupling section 29 including the vibration absorbing member 48 described above. Even when adopting this configuration, it is possible to provide the optical device which is capable of suppressing the noise caused by the micro vibrations and at the same time ensuring the motion followability of the movable frame 22 with the simple structure similarly to the embodiment described above.

Embodiment 3

*Different Aspect-2 of Coupling Section*

Figure 14:
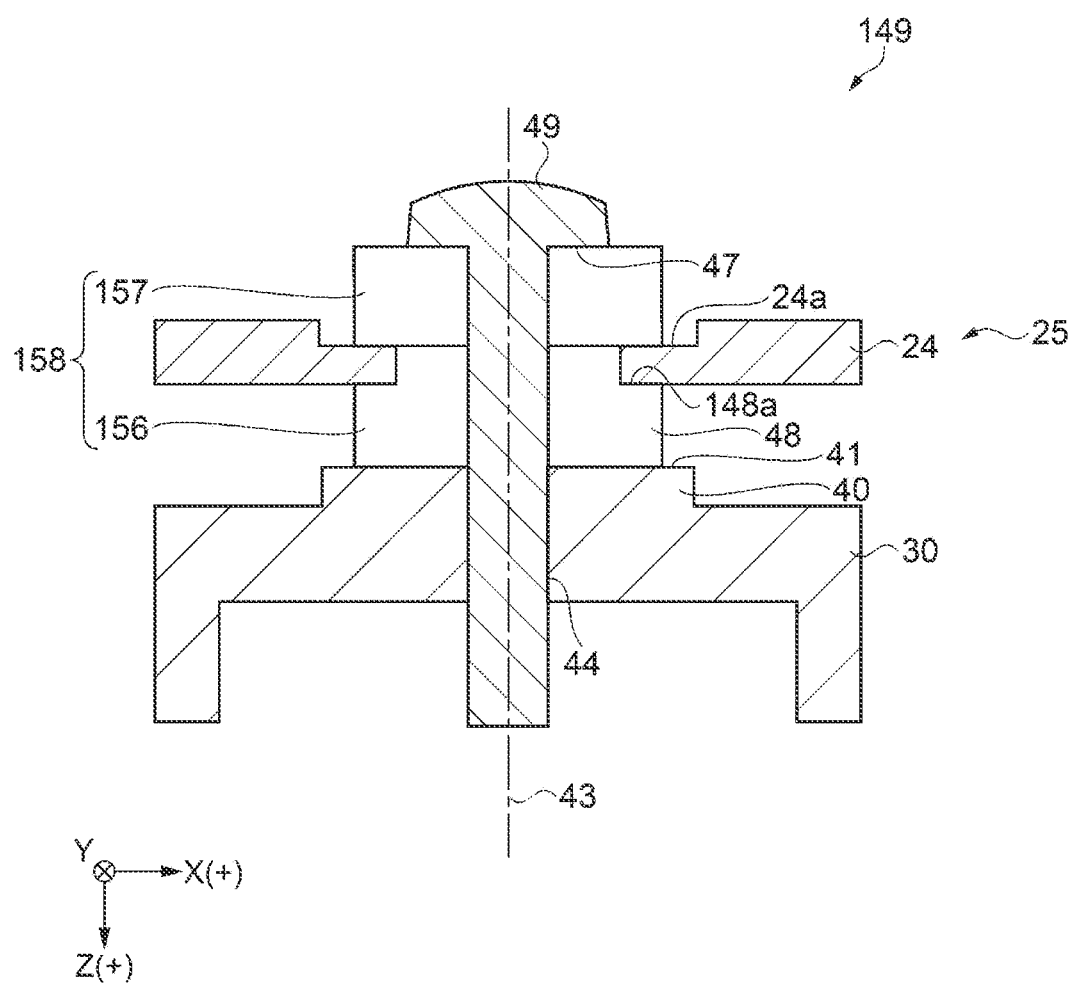
FIG. 14 is a sectional side view of a joint part related to Embodiment 3.

FIG. 14 is a sectional side view of a coupling section in the present embodiment, and corresponds to FIG. 6 and FIG. 13. In Embodiment 2, the vibration absorbing member 148 constituted by the two regions is fixed using the spacer 45 and the washer 46, but this configuration is not a limitation. For example, the spacer 45 and the washer 46 are not required to be used.

A coupling section 149 in the present embodiment is different from the coupling section 129 in Embodiment 2 in the point that the spacer 45 and the washer 46 are not used. The rest of the configuration is the same as that of the coupling section 29 in Embodiment 1. Hereinafter, the same constituent regions as in the embodiments described above are denoted by the same reference numerals, and redundant descriptions will be omitted.

As shown in FIG. 14, the coupling section 149 in the present embodiment is constituted by the vibration absorbing member 158 constituted by two regions, and the screw 49, but does not use the spacer and the washer. The vibration absorbing member 158 is constituted by a first member 156 disposed on the first surface 41 of the pedestal part 40, and a second member 157 to be stacked on the first member 156. The first member 156 and the second member 157 are the same in material, shape, and hardness as the first member 146 and the second member 147 in Embodiment 2, but are formed to be slightly thicker in wall in accordance with the elimination of the spacer.

The first member 156 is set to have the height from the first surface 41 of the pedestal part 40 to the upper surface of the coupling part 24a of the outer frame 24. A portion having contact with the coupling part 24a in the first member 156 is cut out to form a stepped shape.

The second member 157 is a member having a simple circular ring-like shape. When the second member 156 is stacked on the first member 157, there is formed the recessed part 148a shaped like a ring which the coupling part 24a fits in. It should be noted that in the present embodiment, a lower surface of a head part of the screw 49 forms the second surface 47, and the shaft part to which the vibration absorbing member 158 is attached is formed of the screw 49.

In the assembling process, first, the first member 156 is set in each of the coupling parts 24a located at the seven places in the coupling frame 25. In parallel, the second member 157 is attached to each of the screws 49 in advance so that the screw 49 fits in the second member 157.

Subsequently, the coupling frame 25 attached with the first member 156 is mounted on the stationary frame 30. Then, screw fastening is performed in each of the coupling parts 24a at the seven places in the coupling frame 25 with the screw 49 attached with the second member 157.

As described above, by adopting the two-piece configuration in the vibration absorbing member 158, it becomes unnecessary to deform the vibration absorbing member to fit into the outer frame 24 when performing the assembling. Therefore, it is preferable to use the configuration of the coupling section in Embodiment 2 and the present embodiment when using resin as the vibration absorbing member 158 as in Comparative Example 3 and Comparative Example 4.

Further, according to the coupling section 149 in the present embodiment, since the spacer and the washer are not used, it is possible to reduce the number of components. Further, since the configuration is simplified, the man-hour of the assembling also decreases. Further, according to the result of the verification conducted by the inventors, it was found out that the noise suppression effect and the motion followability equivalent to those in each of the embodiments described above can be ensured even in the configuration of the present embodiment.

Embodiment 4

*Different Aspect-3 of Coupling Section*

Figure 15:
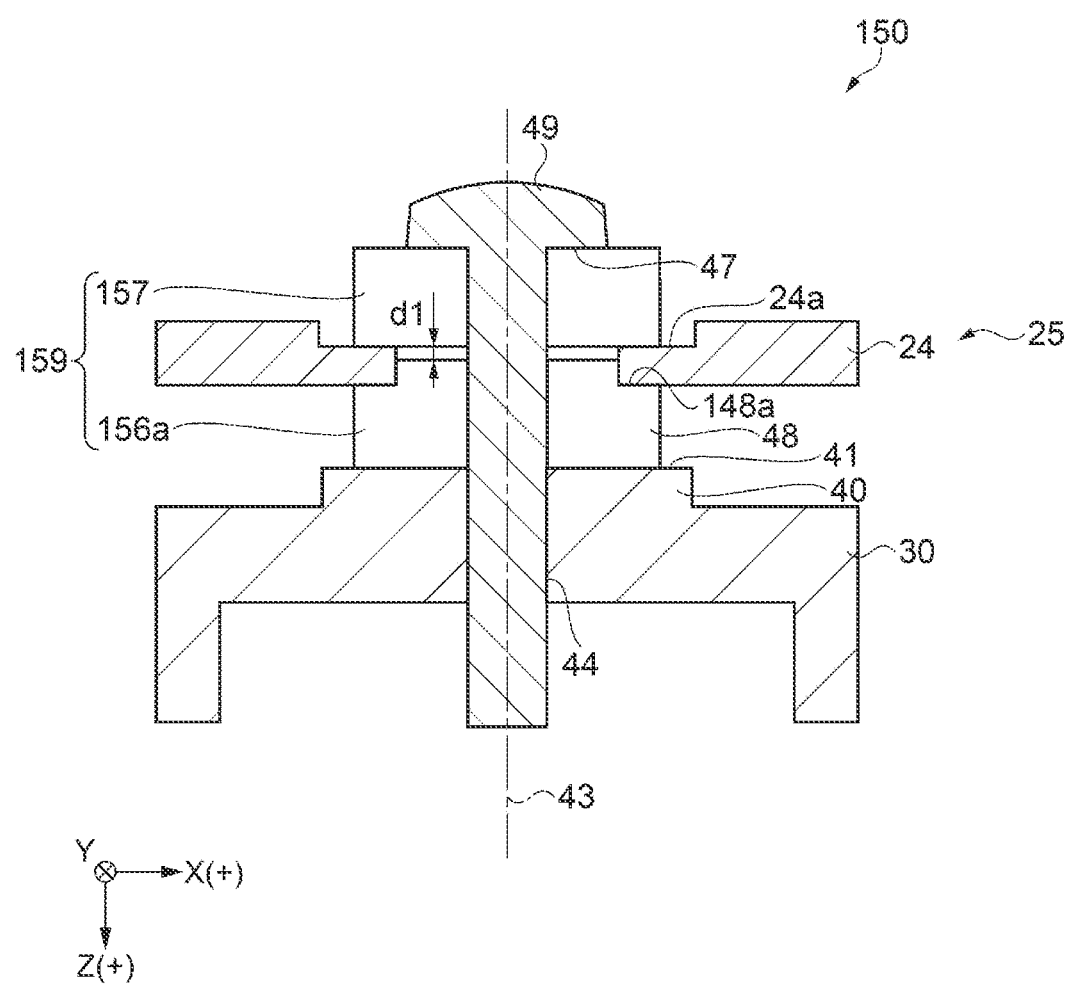
FIG. 15 is a sectional side view of a joint part related to Embodiment 4.

FIG. 15 is a sectional side view of a coupling section in the present embodiment, and corresponds to FIG. 14.

In Embodiment 3, although the description is presented assuming that there is adopted the configuration in which the first member 156 and the second member 157 constituting the vibration absorbing member 158 adhere to each other, it is possible to dispose a gap d1 between the both members. A vibration absorbing member 159 in a coupling section 150 in the present embodiment shown in FIG. 15 is different from the vibration absorbing member 158 shown in FIG. 14 in the point that the gap d1 is disposed between a first member 156a and the second member 157. The rest of the configuration is the same as that of the coupling section 149 in Embodiment 3. Hereinafter, the same constituent regions as in the embodiments described above are denoted by the same reference numerals, and redundant descriptions will be omitted.

As described above, the two-piece configuration is suitable when using resin as the vibration absorbing member 159 from the viewpoint of the easiness in assembly and so on. When using resin, there is no necessity of making the two regions the same in hardness, and it is possible to make the first member 156a and the second member 157 different in hardness within the range of the hardness described above. For example, it is possible to make the first member 156a higher in hardness than the second member 157. As an example, it is possible to form the first member 156a from the fluorocarbon resin with the Rockwell hardness of R95, and to form the second member 157 from the fluorocarbon resin with the Rockwell hardness of R90. It should be noted that the numerical values of the hardness are illustrative only, and it is sufficient to properly provide a difference in hardness between the both members in accordance with the design specifications within the range of the hardness.

The first member 156a is formed to have the height lower than the first member 156 in Embodiment 3 as much as the gap d1. When there is adopted the dimension setting in which the first member 156a and the second member 157 have contact with each other, when the height of the first member 156a becomes higher due to the production tolerance, the first member 156a pushes up the second member 157, and thus, the contact of the second member 157 with the coupling part 24a becomes insufficient. When the contact is insufficient, there is a possibility that the vibration suppression effect by the second member 157 cannot be obtained. Therefore, the gap d1 is set to a dimension larger than the maximum tolerance in the design height of the first member 156a.

According to this configuration, even when the production tolerance exists, it is possible to prevent the first member 156a from affecting the second member 157. Further, when adopting this configuration, since the coupling part 24a of the coupling frame 25 adheres to and is clamped by the second member 157 at the upper side and the cutout having the stepped shape of the first member 156a at the lower side, it is possible to obtain substantially the same functions and advantages as each of the embodiments described above. It should be noted that it is possible to add only the washer 46 (FIG. 6) in the configuration shown in FIG. 14 and the configuration shown in FIG. 15 in order to further increase the adhesiveness of the second member 157 to the coupling part 24a.

What is claimed is:

1. An optical device comprising:
    an optical device including an optical member having a plane of incidence which light enters, a movable frame configured to hold the optical member, and a coupling frame to be coupled to the movable frame via an oscillation axis; and
    a stationary frame to which the coupling frame in the optical device is fixed via a vibration absorbing member, wherein
    the stationary frame has a shaft part to which the vibration absorbing member is attached, and a first surface and a second surface opposed to each other outside the shaft part,
    the coupling frame is disposed so as to be separated from the shaft part, the first surface, and the second surface with the vibration absorbing member, and
    at least one of a thickness of the vibration absorbing member existing between the coupling frame and the first surface in the stationary frame and a thickness of the vibration absorbing member existing between the coupling frame and the second surface in the stationary frame is thicker than a thickness of the vibration absorbing member existing between the coupling frame and the shaft part of the stationary frame.

2. The optical device according to claim 1, wherein the thickness of the vibration absorbing member existing between the coupling frame and the first surface in the stationary frame and the thickness of the vibration absorbing member existing between the coupling frame and the second surface in the stationary frame are larger than the thickness of the vibration absorbing member existing between the coupling frame and the shaft part.

3. The optical device according to claim 1, wherein at least one of the thickness of the vibration absorbing member existing between the coupling frame and the first surface in the stationary frame and the thickness of the vibration absorbing member existing between the coupling frame and the second surface in the stationary frame is larger than a thickness of the coupling frame in a direction parallel to the shaft part.

4. The optical device according to claim 3, wherein the thickness of the vibration absorbing member existing between the coupling frame and the shaft part is larger than the thickness of the coupling frame in the direction parallel to the shaft part.

5. The optical device according to claim 1, wherein the vibration absorbing member is no lower than 20 in durometer hardness, and no higher than R95 in Rockwell hardness.

6. The optical device according to claim 1, wherein the vibration absorbing member is made of a resin material, and
    a hardness change with temperature of the vibration absorbing member is lower than 1% per ° C. in a range of 0° C. through 100° C.

7. The optical device according to claim 1, wherein the vibration absorbing member is larger than a length of the shaft part in a direction parallel to the shaft part, and
    the vibration absorbing member is compressed between the first surface and the second surface in the stationary frame with a screw disposed in a through hole of the shaft part.

8. The optical device according to claim 1, wherein the vibration absorbing member is constituted by a first member and a second member stacked on one another, the first member being disposed on the first surface, and the second member being disposed on the second surface.

9. The optical device according to claim 1, wherein the coupling frame includes an outer frame, and an inner frame which is coupled to the oscillation axis inside the outer frame.

10. The optical device according to claim 1, wherein the stationary frame includes a pedestal part having the first surface, and a washer having the second surface.

11. The optical device according to claim 1, wherein a weight of the optical device is no lower than 40 gf and no higher than 70 gf, and
    a number of coupling sections with which the coupling frame is fixed to the stationary frame via the vibration absorbing member is no smaller than 4 and no larger than 7.

12. The optical device according to claim 11, further comprising:
    a first actuator configured to vibrate the movable frame via the oscillation axis; and
    a second actuator configured to vibrate the movable frame via the oscillation axis with a higher excitation force than that in the first actuator, wherein
    the coupling section with which the coupling frame is fixed to the stationary frame via the vibration absorbing member is disposed at a plurality of places, and
    out of shortest distances between each of the coupling sections and the first actuator and the second actuator, there exists the coupling section the distance of which from the second actuator is shorter than the distance between another of the coupling sections and the first actuator.

13. An image display device comprising:
    a light modulation element including a plurality of pixels;
    a projection optical system configured to project light from the light modulation element; and the optical device according to claim 1 which the light from the light modulation element enters.

\* \* \* \* \*

UNITED STATES PATENT AND TRADEMARK OFFICE
CERTIFICATE OF CORRECTION

PATENT NO. : 11,683,457 B2
APPLICATION NO. : 17/507905
DATED : June 20, 2023
INVENTOR(S) : Yoshiyuki Yanagisawa, Masatoshi Ito and Shinichi Wakabayashi It is certified that error appears in the above-identified patent and that said Letters Patent is hereby corrected as shown below:

On the Title Page

Item (73), please change the Assignee from "Seiko Epson Corportation, Tokyo (JP)" to "Seiko Epson Corporation, Tokyo (JP)".

Signed and Sealed this
Sixth Day of August, 2024

Katherine Kelly Vidal
*Director of the United States Patent and Trademark Office*